(12) United States Patent
Sydorenko et al.

(10) Patent No.: US 10,854,147 B2
(45) Date of Patent: Dec. 1, 2020

(54) VISUAL EFFECT PROVISION METHOD AND ELECTRONIC DEVICE USING THE SAME

(71) Applicant: Samsung Electronics Co., Ltd., Suwon-si (KR)

(72) Inventors: Dmytro Sydorenko, Kyiv (UA); Andrii Bogachenko, Kyiv (UA); Roman Kushnirenko, Oleksandriya (UA); Svitlana Alkhimova, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/705,971

(22) Filed: Dec. 6, 2019

(65) Prior Publication Data

US 2020/0184910 A1 Jun. 11, 2020

(30) Foreign Application Priority Data

Dec. 7, 2018 (KR) .................. 10-2018-0157363

(51) Int. Cl.
*G09G 3/34* (2006.01)

(52) U.S. Cl.
CPC ... *G09G 3/3413* (2013.01); *G09G 2320/0626* (2013.01); *G09G 2320/0666* (2013.01); *G09G 2340/045* (2013.01)

(58) Field of Classification Search
CPC .................. G09G 3/34; G09G 3/3413; G09G 2320/0626; G09G 2320/0646; G09G 2320/0666; G09G 2340/045
See application file for complete search history.

(56) References Cited

U.S. PATENT DOCUMENTS

| 8,934,059 B2 | 1/2015 | Lowe et al. |
| 10,254,958 B2 | 4/2019 | Jeong et al. |
| 2010/0052548 A1* | 3/2010 | Allard .................. G09G 3/3413 315/154 |
| 2010/0053229 A1 | 3/2010 | Krijn et al. |

(Continued)

FOREIGN PATENT DOCUMENTS

| EP | 0913626 A1 | 5/1999 |
| KR | 10-2016-0027778 A | 3/2016 |

OTHER PUBLICATIONS

International Written Opinion of the International Searching Authority in connection with International Application No. PCT/KR2019/017207 dated Mar. 24, 2020, Form PCT/ISA/237, 5 pages. (Year: 2020).*

(Continued)

*Primary Examiner* — Jeffery A Brier

(57) ABSTRACT

A visual effect provision method and an electronic device using the same. The electronic device includes a display, a bezel bordering at least one side of the display, a light emitting module including multiple light sources, a light diffusing module arranged above the light emitting module to cover the light emitting module, a memory, and a processor configured to control to display an execution screen of an application on the display, determine attribute information on light to be emitted by the light emitting module based on the execution screen of the application, and emit the light by means of the light emitting module based on the attribute information on the light.

20 Claims, 31 Drawing Sheets

(56) References Cited

U.S. PATENT DOCUMENTS

| | | |
|---|---|---|
| 2010/0091193 A1 | 4/2010 | Hoogenstraaten et al. |
| 2010/0201878 A1 | 8/2010 | Barenbrug et al. |
| 2010/0289666 A1* | 11/2010 | Hardacker ......... H04N 1/00347 340/815.45 |
| 2013/0271447 A1* | 10/2013 | Setlur ................... G06F 1/1626 345/418 |
| 2014/0177062 A1 | 6/2014 | Lee et al. |
| 2017/0053478 A1 | 2/2017 | Wudtke et al. |
| 2017/0208287 A1* | 7/2017 | Lim ................... H04N 21/4131 |
| 2018/0017996 A1 | 1/2018 | Ryu et al. |
| 2018/0121067 A1 | 5/2018 | Lee et al. |
| 2018/0157095 A1 | 6/2018 | Lee et al. |

OTHER PUBLICATIONS

International Search Report and Written Opinion of the International Searching Authority in connection with International Application No. PCT/KR2019/017207 dated Mar. 24, 2020, 3 pages.

* cited by examiner

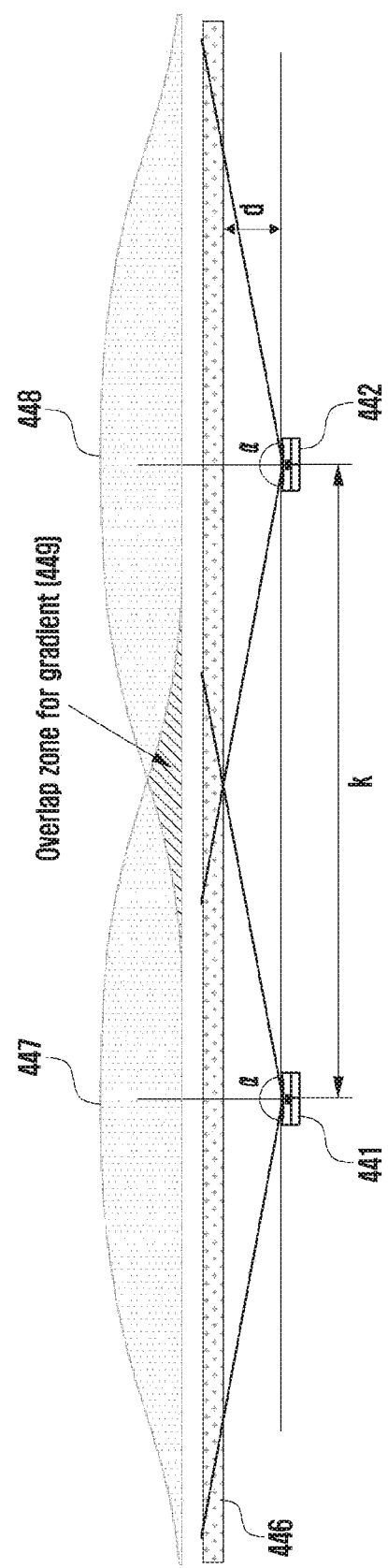

US 10,854,147 B2

VISUAL EFFECT PROVISION METHOD AND ELECTRONIC DEVICE USING THE SAME

CROSS-REFERENCE TO RELATED APPLICATIONS

This application is based on and claims priority under 35 U.S.C. 119 to Korean Patent Application No. 10-2018-0157363 filed on Dec. 7, 2018 in the Korean Intellectual Property Office, the disclosures of which are herein incorporated by reference in their entireties.

BACKGROUND

1. Field

Various disclosed embodiments relate to a visual effect provision method and an electronic device using the same.

2. Description of Related Art

Recently, the screen sizes of electronic devices such as mobile terminals have become bigger and bigger to provide users with a wide range of functions and experiences.

SUMMARY

It may be necessary to design a large electronic device to increase a display screen size thereof. However, it is difficult to increase the size of the electronic device unlimitedly because portability is one of the main design goals of most portable electronic devices such as mobile terminals. An obvious approach to increase the screen size without increasing the device size is to reduce the bezels surrounding the display screen. However, no matter how much the bezels shrink, the border between the screen and the bezels is likely to make the user feel awkward. This means that there is some room for improvement between the screen and bezels in terms of user interface for making the user feel as if the screen is infinite and removing such feeling of awkwardness, thereby leading to increases in the interest and purchasing desire of customers.

According to various disclosed embodiments, an electronic device includes a display, a bezel bordering at least one side of the display, a light emitting module including multiple light sources, a light diffusing module arranged above the light emitting module to cover the light emitting module, a memory, and a processor configured to control to display an execution screen of an application on the display, determine attribute information on a light to be emitted by the light emitting module based on the execution screen of the application, and emit the light by means of the light emitting module based on the attribute information on the light.

According to various disclosed embodiments, a method of an electronic device including a display, a bezel bordering at least one side of the display, a light emitting module including multiple light sources, and a light diffusing module arranged above the light emitting module to cover the light emitting module includes displaying an execution screen of an application on the display, determining attribute information on a light to be emitted by the light emitting module based on the execution screen of the application, and emitting the light by means of the light emitting module based on the attribute information on the light.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

In the drawings, the same or similar reference numerals may be used for the same or similar components.

FIGS. 4B to 4E are diagrams illustrating a light emitting module and a light diffusing module of an electronic device according to various disclosed embodiments;

DETAILED DESCRIPTION

FIGS. 1 through 16B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
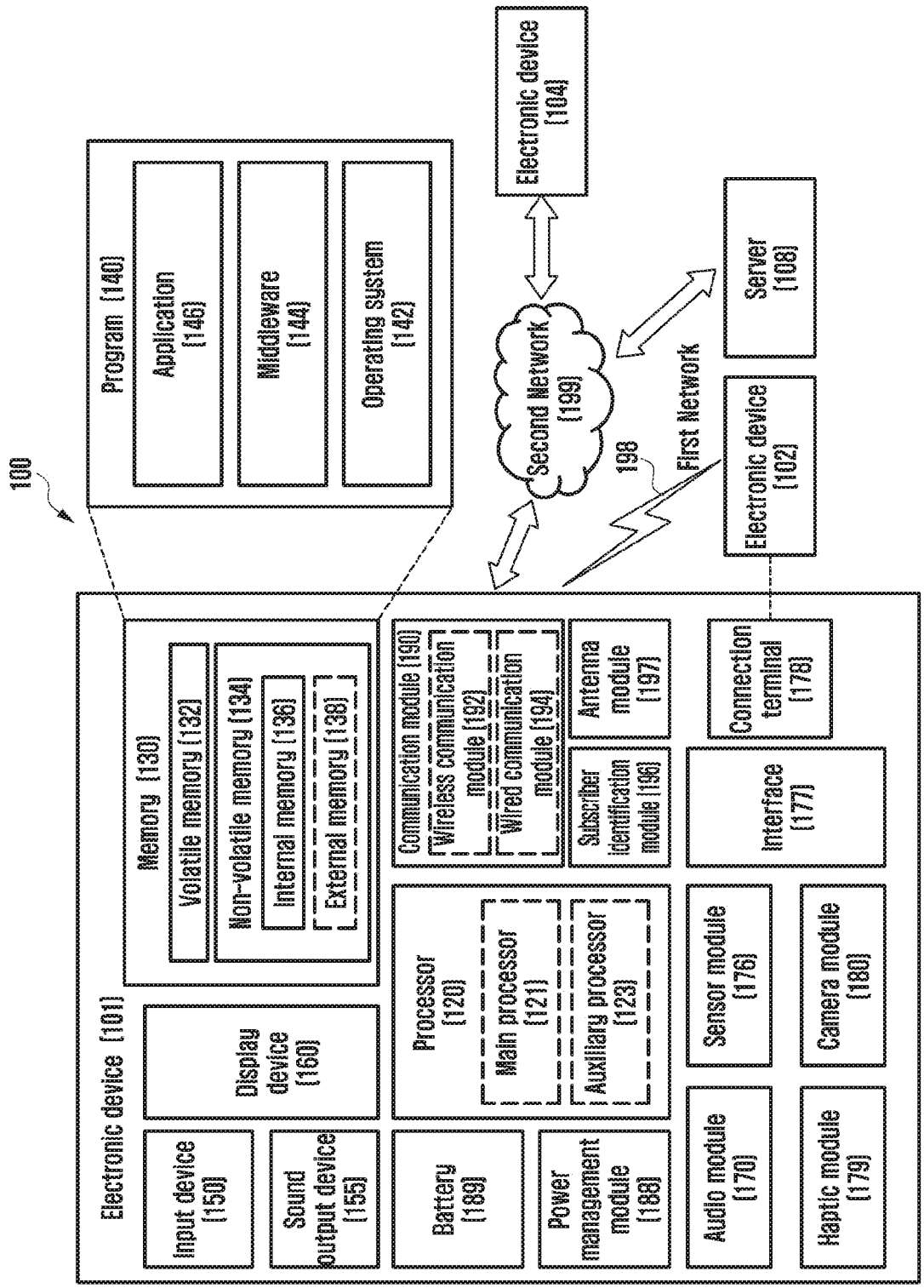
FIG. 1 is a block diagram illustrating an electronic device in a network environment according to various disclosed embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2:
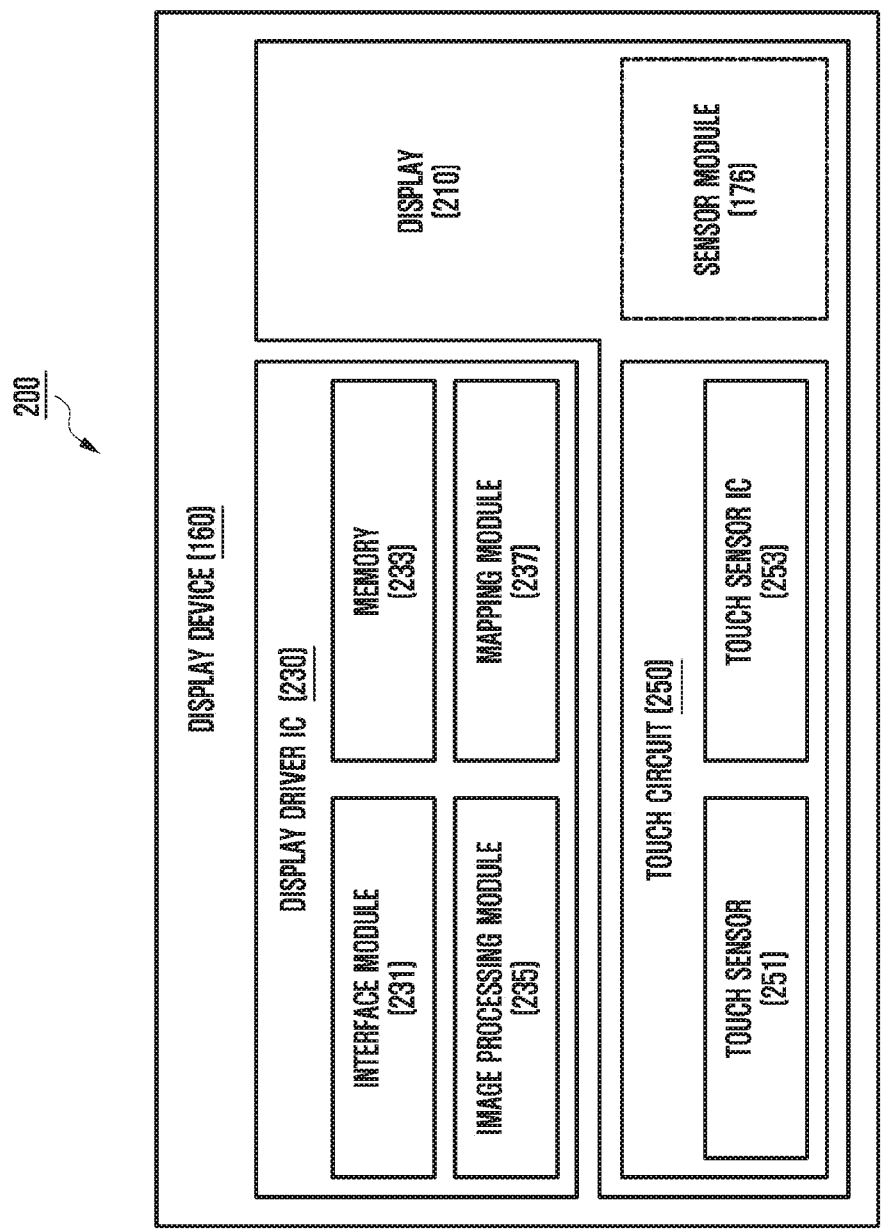
FIG. 2 is a block diagram illustrating a configuration of a display device according to various disclosed embodiments.

FIG. 2 is a block diagram 200 illustrating the display device 160 according to various embodiments. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
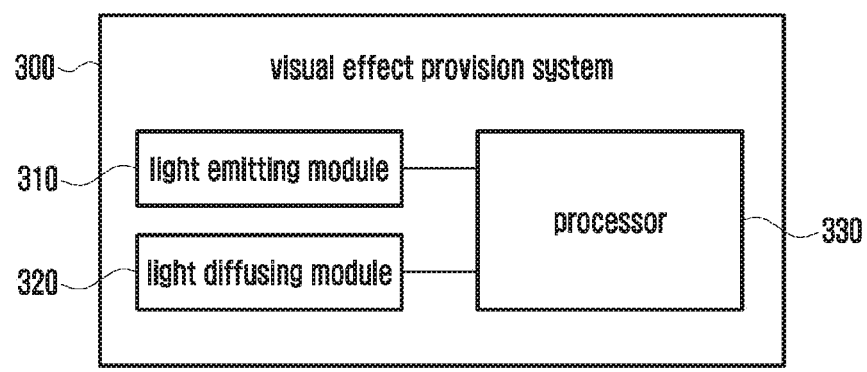
FIG. 3 is a schematic block diagram illustrating a configuration of a visual effect provision system of an electronic device according to various disclosed embodiments.

FIG. 3 is a schematic block diagram illustrating a configuration of a visual effect provision system of an electronic device according to various disclosed embodiments.

According to various embodiments, the electronic device 101 may include a visual effect provision system 300. For example, the visual effect provision system 300 may include a light emitting module 310, a light diffusing module 320, and a processor 330 (e.g., processor 120 in FIG. 1).

According to various embodiments, the electronic device 101 is capable of providing a visual effect in a bezel area of the electronic device by means of the visual effect provision system 300. For example, the bezel area may mean an area forming the edge of the electronic device 101 and surrounding the display device (e.g., display device 160 in FIG. 1) of the electronic device 101. If the bezel area is narrow, this provides a feeling of the screen of the electronic device being tightly packed, leading to a sense immersion for the user who is watching contents such as a movie or drama. That is, a narrow bezel fixes the viewer's attention on the screen, which improves the viewer's immersion. However, narrowing the bezel area increases the probability of a malfunctioning of the electronic device 101 because it is likely that part of a hand holding the electronic device 101 will touch the screen (e.g., touch display screen) unintentionally. Meanwhile, it is not easy to remove or reduce the bezel area because the bezel area is useful for securing space for mounting various devices (e.g., sensor module (sensor module 176 in FIG. 1), camera module (camera module 180 in FIG. 1), audio output device (e.g., sound output device 155 in FIG. 1), and antenna module (e.g., antenna module 197 in FIG. 1)). Accordingly, there is a need of a method for improving a viewer's immersion with the screen while maintaining the bezel area. The electronic device 101 may be configured to provide a visual effect in the bezel area by means of the visual effect provision system 300, which makes it possible for the user to feel as if the bezel area is part of the display device 160. This makes the user of the electronic device 101 feel as if the screen of the electronic device 101 is infinite, giving the user a sense of immersion into the content on the screen.

According to various embodiments, the light emitting module 310 of the visual effect provision system 300 may include a plurality of light sources. Examples of the light sources may include light emitting diodes (LEDs) and organic LEDs (OLEDs). For example, the light sources may be mounted in the bezel area of the electronic device 101. The light sources may be arranged at a regular interval without disrupting other modules mounted in the bezel area. The light resources may emit different colored lights under the control of the processor 330. For example, the lights emitted by the light sources may be identical with or different from each other in color. For example, some of the light sources may be turned off while the others are turned on.

According to various embodiments, the light diffusing module 320 of the visual effect provision system 300 may diffuse the light emitted by the light emitting module 310. For example, the light diffusing module 320 may be provided in the form of a film (e.g., acrylic or polycarbonate film) that may decrease the brightness of the light emitted by the light emitting module 310. For example, the light emitting module 310 may emit light that is distributed at a predetermined interval or randomly in the bezel area such that the user sees bright light forming circles around the light sources. The light diffusing module 320 of the visual effect provision system 300 may distribute the light emitted by the light emitting module 310 such that the emitted light is diffused to be weakened in brightness. Although the light sources of the light emitting module 310 emit light of different colors, the different types of colored light are diffused by the light diffusing module 320 so as to be overlapped with each other, which may give the user a more natural gradation effect. This may mitigate any awkwardness between the visual effect on the bezel area and a screen display on the display device 160.

According to various embodiments, the processor 330 of the visual effect provision system 300 may determine at least one of a color, brightness, or blinking pattern of a light to be emitted by the light emitting module 310 and control the light emitting module 310 to operate based on the determination.

According to various embodiments, the processor 330 of the visual effect provision system 300 may check color information corresponding to an edge of the display device 160 or an area including the edge and control the light emitting module 310 to emit light corresponding to the checked color information. For example, if the bezel area is very thin, it may be possible to secure continuity between the bezel area and the screen displayed on the display device 160 just by emitting light identical in color with that at the edge of the display device 160.

According to various embodiments, the processor 330 of the visual effect provision system 300 may enlarge the displayed contents to be suitable for the display device 160. The processor 330 may check the information on the contents located in the bezel area outside the display area of the display device 160. For example, the processor 330 may check the information on the location of the contents in the bezel area and the color corresponding to the location. The processor 330 may check the information on the location where the light emitting module 310 is arranged and the color of the contents corresponding to the location of the light emitting module 310. The processor 330 may control the light emitting module 310 to emit light corresponding to the information on the color of the contents based on the color information of the contents corresponding to the location of the light emitting module 310.

According to various embodiments, the processor 330 of the visual effect provision system 300 may provide the user with at least visual information via the bezel area in addition to a continuity effect between the bezel area and the screen of the display device 160. A detailed description thereof is made hereinafter with reference to FIGS. 9 to 14.

Figure 4A:
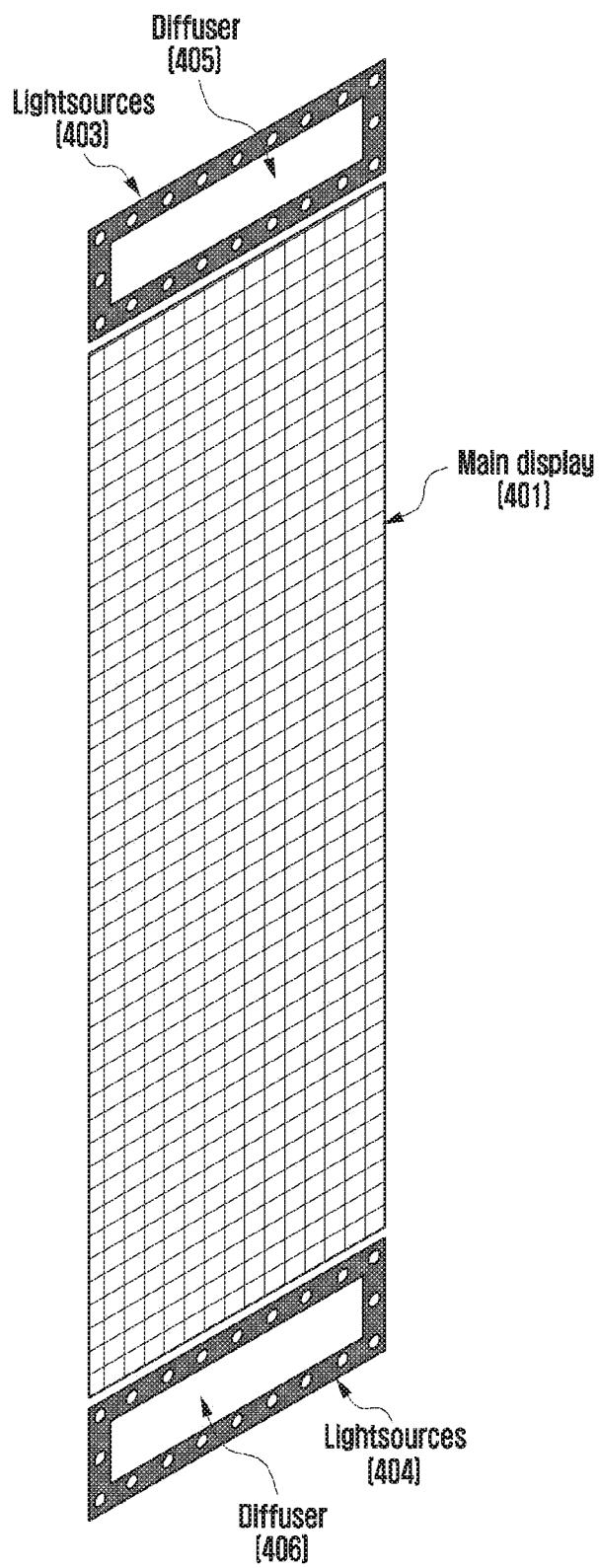
FIG. 4A is a schematic diagram illustrating a configuration of a display device of an electronic device according to various disclosed embodiments.

FIG. 4A is a schematic diagram illustrating a configuration of a display device of an electronic device according to various disclosed embodiments.

According to various embodiments, light source areas corresponding to bezel areas of the electronic device 101 are distinguished from a display device area.

According to various embodiments, the light source areas corresponding to the bezel areas may include an upper light source area (e.g. areas where light sources 403 and a diffuser 405 are located) and a lower light source area (e.g., area where light sources 404 and a diffuser 406 are located). It may be possible that just one of the upper and lower light source areas is implemented to the corresponding bezel area. For example, the light sources 403 and 404 may correspond to the light emitting module 310 of FIG. 3, and the diffusers 405 and 406 may correspond to the light diffusing module 320.

According to various embodiments, the display device area may include a main display 401 (e.g., display 210 in FIG. 2). The display device area may be provided with a touch circuit (e.g., touch circuit 250 in FIG. 2) to receive at least one type of touch input made by a user.

FIGS. 4B to 4E are diagrams for explaining a light emitting module and a light diffusing module of an electronic device according to various disclosed embodiments.

Figure 4B:
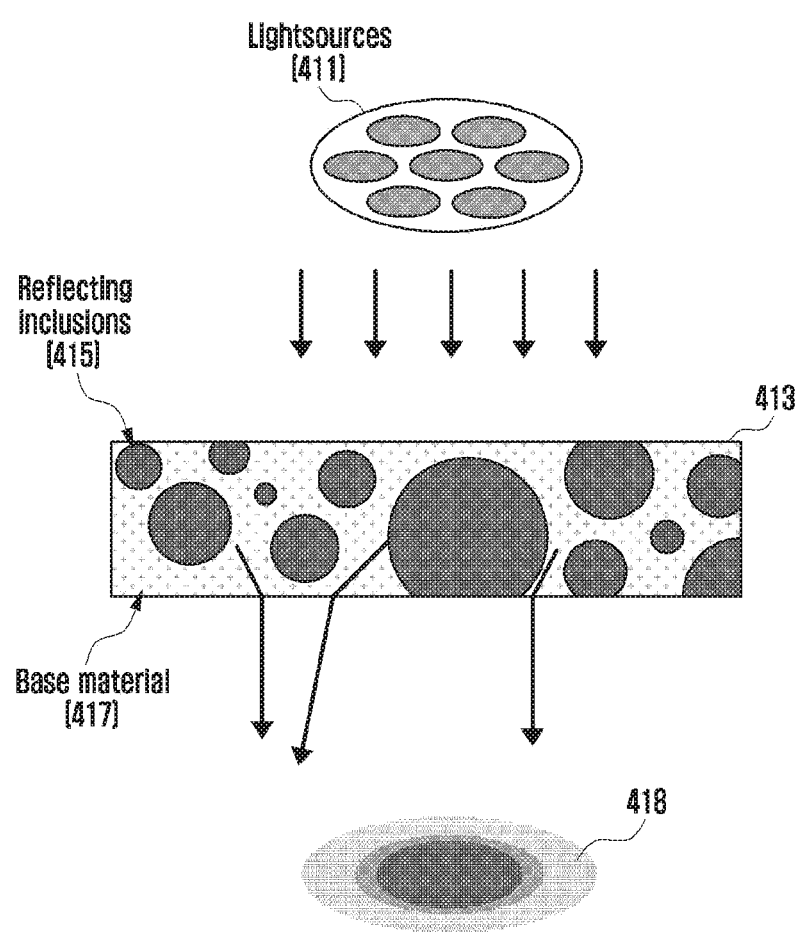

According to various embodiments, light emitted by light sources 411 is diffused by a diffuser 413 as shown in FIG. 4B. For example, the diffuser 413 may be composed of a base material 417 and reflecting inclusions 415. The reflecting inclusions are irregularly diffused in the base material 417 so as to reflect the light emitted by the light sources. For example, the light emitted by the light sources 411 passes through the diffuser 413 so as to be projected in the form of reflected light 418. The reflected light 418 may form an image that varies in shape according to the thickness of the diffuser 413, the kind of the base material 417, and the kind of the reflecting inclusions 415, and the outline of the image may not match with the outline of the corresponding light source or may be blurred according to a reflected degree. For example, the reflected light may be brightest at the center of the image corresponding to the light source and its brightness may taper off towards the edge of the image.

Figure 4C:
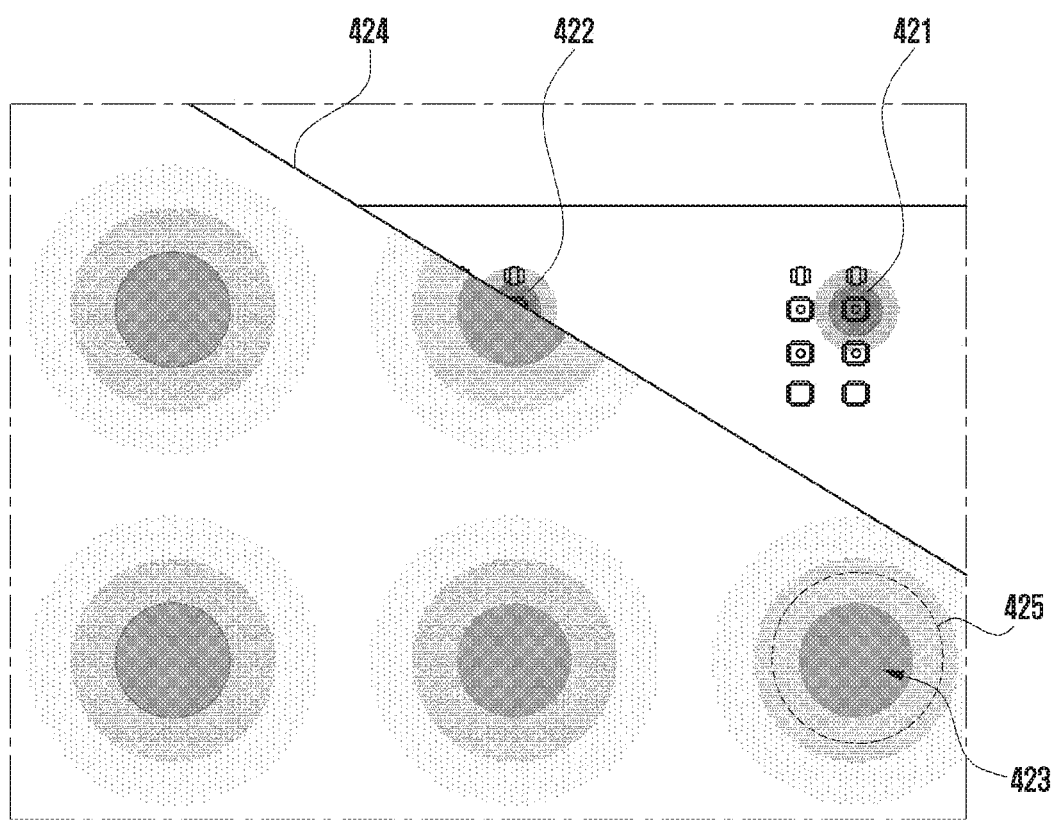

According to various embodiments, a plurality of light sources 421, 422, and 423 may be arranged in an area corresponding to a bezel as shown in FIG. 4C. The electronic device 101 may include a diffuser 424 for diffusing the light emitted by the light sources 421, 422, and 423. For example, the light emitted by the first and second light sources 421 and 423 may produce different visual effects. The light emitted by the first light source 421 reaches the eye with a strong intensity because the first light source 421 is not covered by the diffuser 424. Meanwhile the light emitted by the second light source 423 reaches the eye with an intensity weaker than that of the second light source 423 and become weaker from the center of the light source towards the periphery 425 because the second light source 423 is covered by the diffuser 424.

Figure 4D:
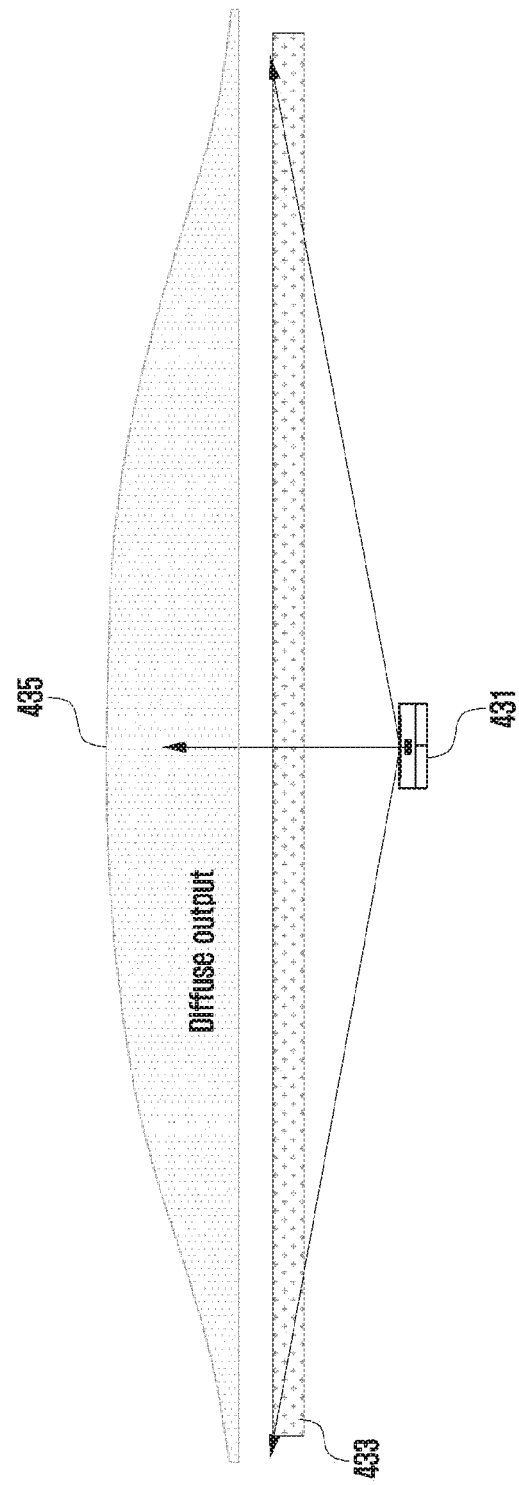

According to various embodiments, the light emitted by the light source 431 is diffused by the diffuser 433, resulting in a diffuse output 435 as shown in FIG. 4D. Typically, the light may diffuse away from the center of the light source 431 in a circular manner such that the brightness is greatest at the center and tapers off towards the periphery.

According to various embodiments, the light emitted by multiple light sources 441 and 442 is diffused by the diffuser 446, resulting in diffuse results 447, 448, and 449 as shown in FIG. 4E. For example, the diffuse result 447 of the light emitted by the first light source 441 and the diffuse result 448 of the light emitted by the second light source 442 may be overlapped to form the diffuse result 449; in this manner, the electronic device 101 may produce a gradation effect using the multiple light sources 441 and 442.

According to various embodiments, an emission angle α of each of the first and second light sources 441 and 442 may be set to 140°, a distance k between the first and second light sources 441 and 442 may be set to 5.5 mm, and a distance d between each of the first and second light sources 441 and 442 and the diffuser 446 may be set to 1 mm.

Figure 4F:
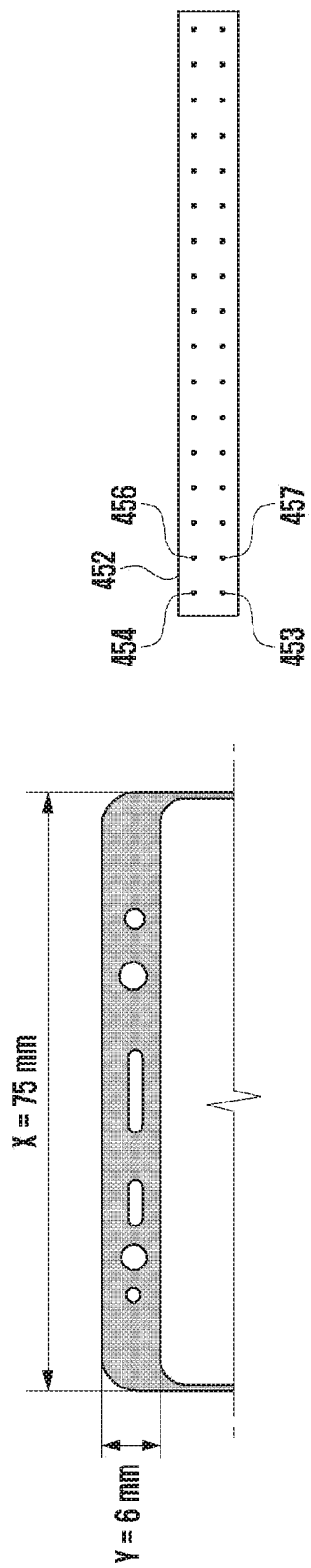
FIG. 4F is a diagram illustrating mounting positions of a light emitting module and a light diffusing module in an electronic device according to various disclosed embodiments.

FIG. 4F is a diagram for explaining mounting positions of a light emitting module and a light diffusing module in an electronic device according to various disclosed embodiments.

According to various embodiments, the electronic device 101 is provided with a bezel area to which the light emitting modules 453, 454, 456, and 457 and the light diffusing module 452 correspond as shown in FIG. 4F.

According to various embodiments, the bezel area has a width X of 75 mm and a height Y of 6 mm as shown in FIG. 4F. The bezel area of the electronic device 101 may provide a space for mounting at least 28 light sources (e.g., 14 in a width-wise direction and 2 in a height-wise direction, 14×2) emitting differently colored light as determined by the processor 330 under the control of the processor 330.

Figure 5:
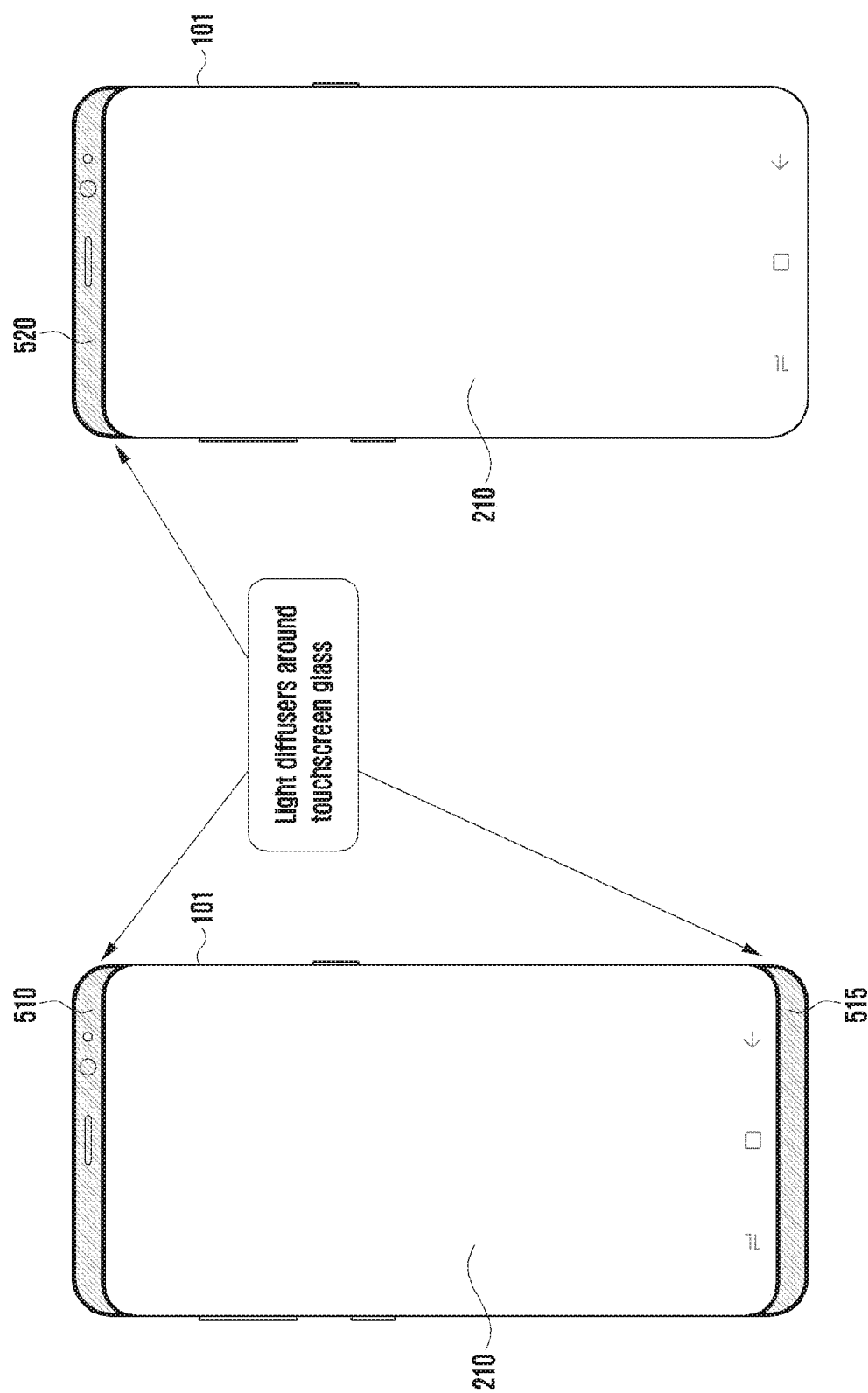
FIG. 5 is a diagram illustrating bezel areas of an electronic device according to various disclosed embodiments.

FIG. 5 is a diagram illustrating bezel areas of an electronic device according to various disclosed embodiments.

According to various embodiments, the electronic device 101 may produce a visual effect on the bezel areas 510, 515, and 520 of the electronic device 101 by means of the visual effect provision system 300. The visual effect may mitigate an awkwardness between the display 210 and the bezel areas 510, 515, and 520, which makes a user perceive the screen as larger than it really is.

FIGS. 6A to 6D are diagrams for explaining a method for determining a color of light to be emitted by a light emitting module of the electronic device according to various disclosed embodiments.

According to various embodiments, the electronic device (e.g., electronic device 101 in FIG. 1 and processor 330 in FIG. 3) may determine at least one of a color, brightness, or blinking pattern of light to be emitted by the light emitting module 310.

According to various embodiments, the electronic device 101 may display an image 600 of which the size is enlarged to cover the bezel area 610 of the electronic device 101. For example, the electronic device 101 may determine a color of the light to be emitted by a light emitting module (e.g., light emitting module 310 in FIG. 3) corresponding to part 613 of the bezel area 610 based on the enlarged image.

Figure 6A:
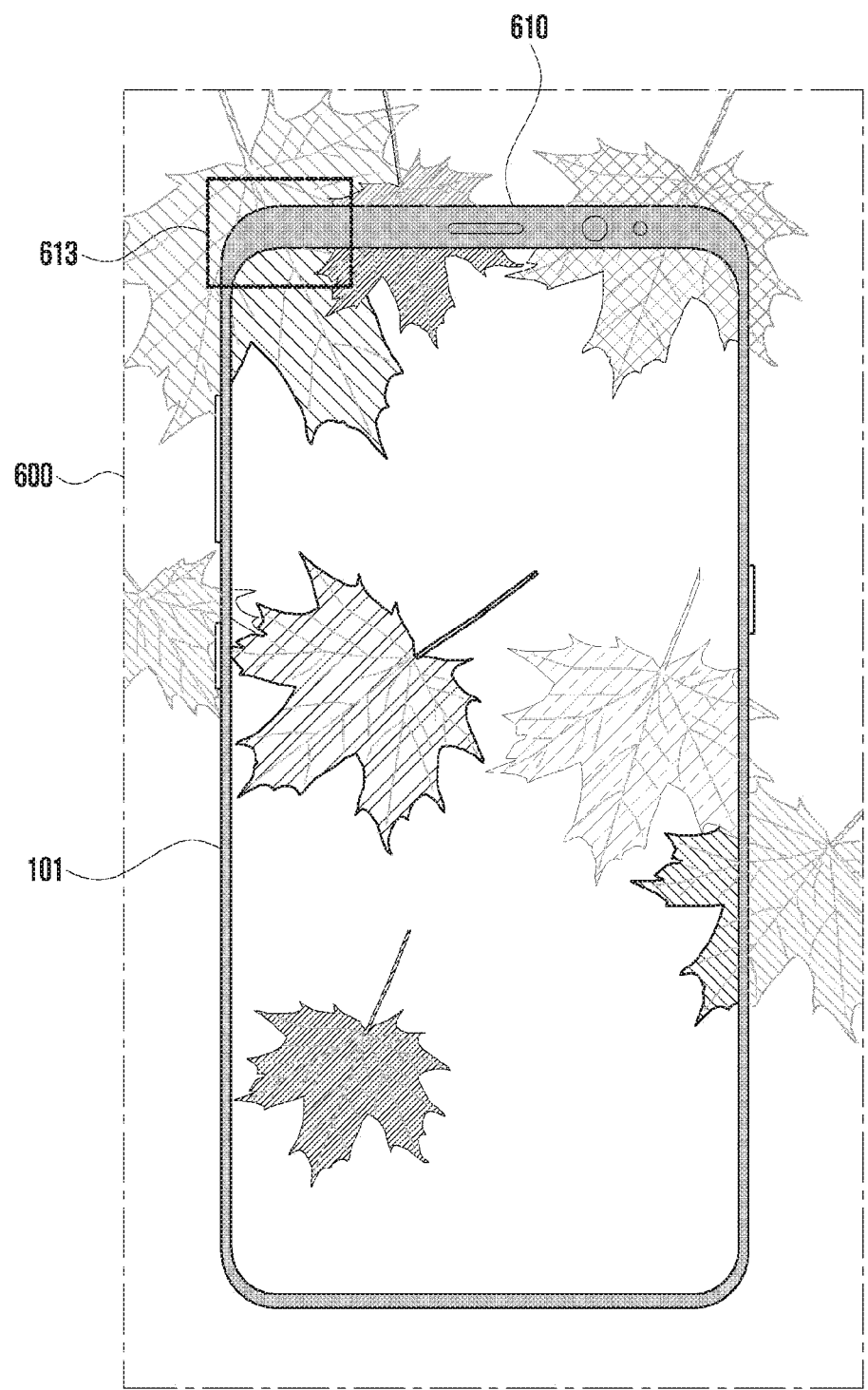
FIGS. 6A to 6D are diagrams illustrating a method for determining a color of a light to be emitted by a light emitting module of the electronic device according to various disclosed embodiments.
Figure 6B:
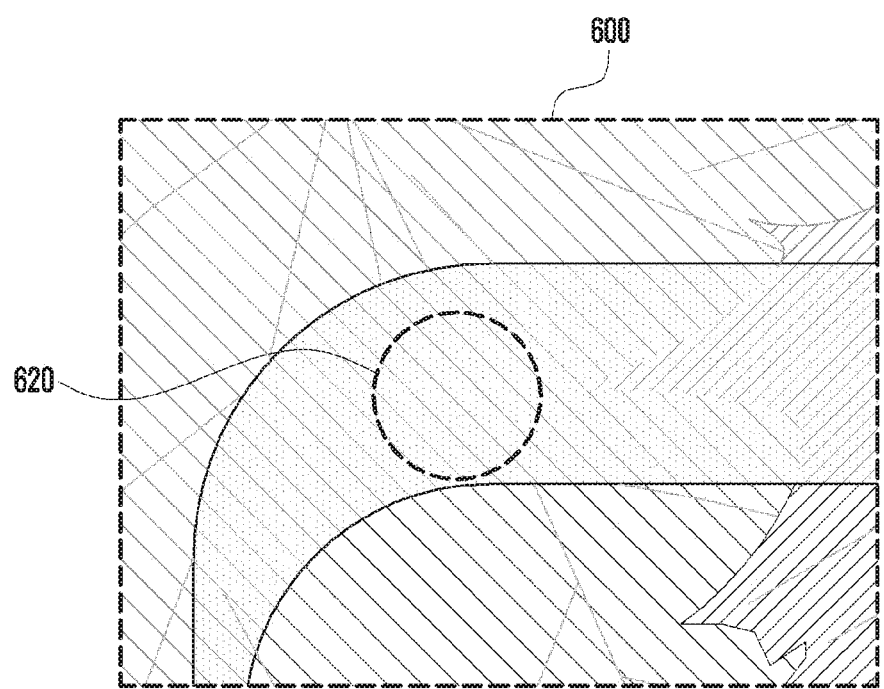

An image 600 corresponding to the part 613 of the bezel area 610 is depicted in more detail in FIG. 6B. For example, the image 600 may include colorful maple leaves. The maple leaves may be variegated with various colors such as red, yellow, and green. The electronic device 101 may check the image corresponding to a location of a light source 620 for a color and determine the color of the light to be emitted by the light source 620, the color of the light being identical with or similar to the checked color.

Figure 6C:
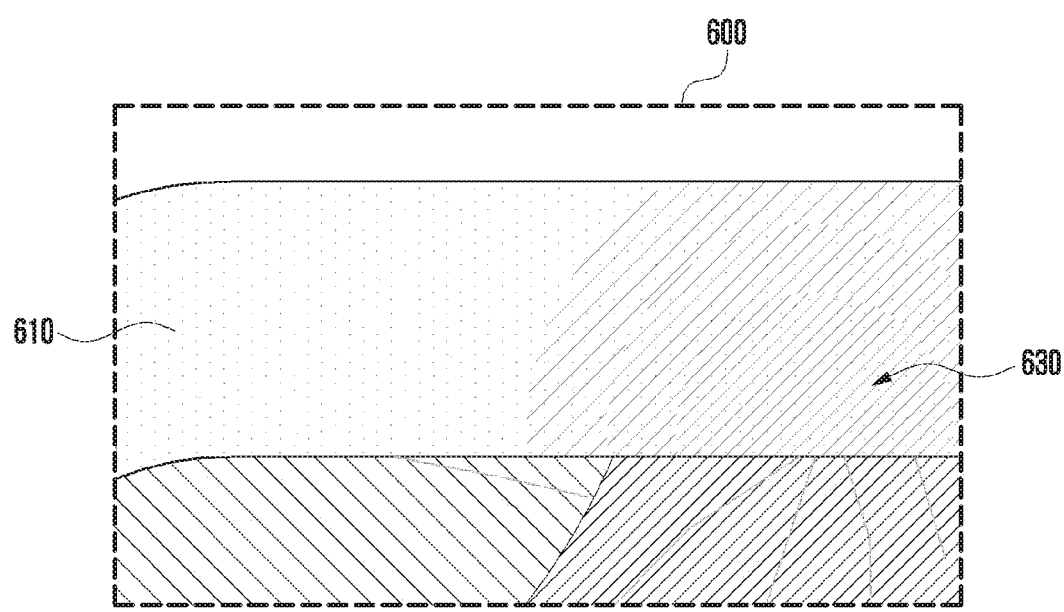
Figure 6D:
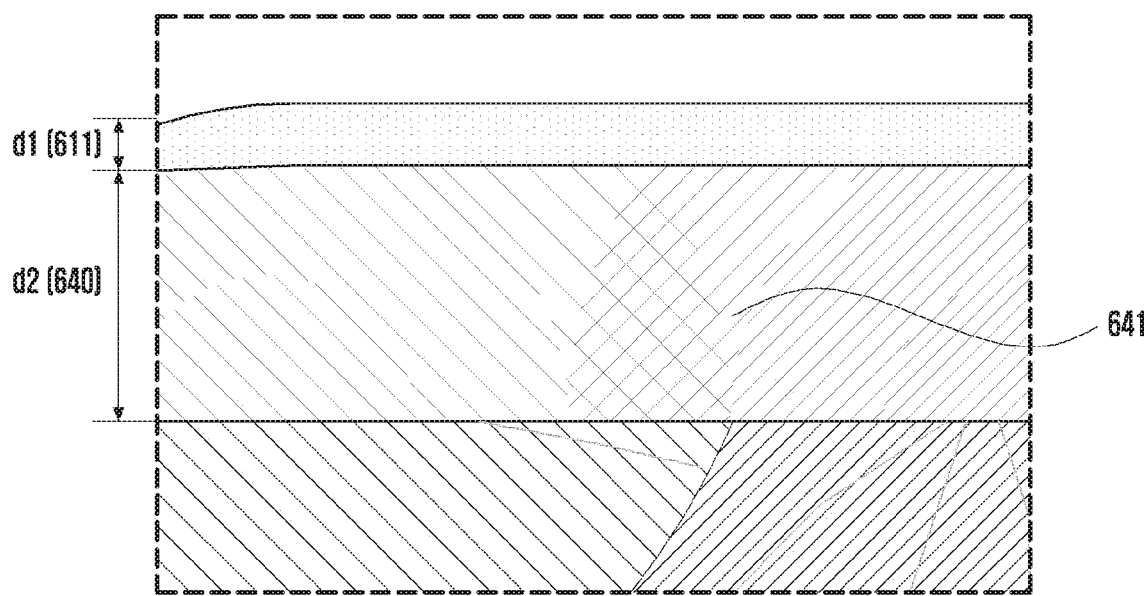

FIG. 6C is an image obtained by zooming in on the image of FIG. 6B to show reflected light 630 produced by a light diffusing module (e.g., light diffusing module 320 in FIG. 3) diffusing the light emitted by the light emitting module (e.g., light emitting module 310 in FIG. 3). For example, the reflected light 630 may be produced on the bezel area 610 by an interaction between the light emitting module 310 mounted at a location corresponding to the center of the reflected light 630 and the light diffusing module 320 covering the light emitting module 310.

According to various embodiments, the electronic device 101 may produce a visual effect by means of the visual effect provision system 300 such that the user perceives the screen as larger than it really is. For example, the bezel area of the electronic device 101 may include a first region 611 and a second region 640. The electronic device 101 may produce a visual effect similar to the image displayed on the display device 160 by means of the visual effect provision system 300, which makes the user feel as if the screen is larger than it really is. The electronic device 101 may be provided with a plurality of light emitting modules arranged at regular intervals in the bezel area to produce a more sophisticated visual effect. For example, assuming a first light source emitting a red light and a second light source emitting a yellow light, the types of reflected light of the first and second light sources may overlap to form an overlap region 641, resulting in an orange light at the center of the overlap region 641. From the center of the overlap region 641, the light color may gradate from orange to red towards the first light source and from orange to yellow towards the second light source.

According to various embodiments, the electronic device 101 is capable of removing any awkwardness felt by a user from the difference between the bezel area and the display area by producing colored light corresponding to the color of the image displayed on the display area or a gradation effect with the displayed colors, which makes the user feel a sense of openness as if the display almost fills up the front surface of the electronic device 101. For example, the user may perceive length d1 611, rather than the sum of lengths d1 and d2 611 and 640, as the bezel area, making the user feel as if the size of the display device 160 is expanded by as much as d2 640.

Figure 7A:
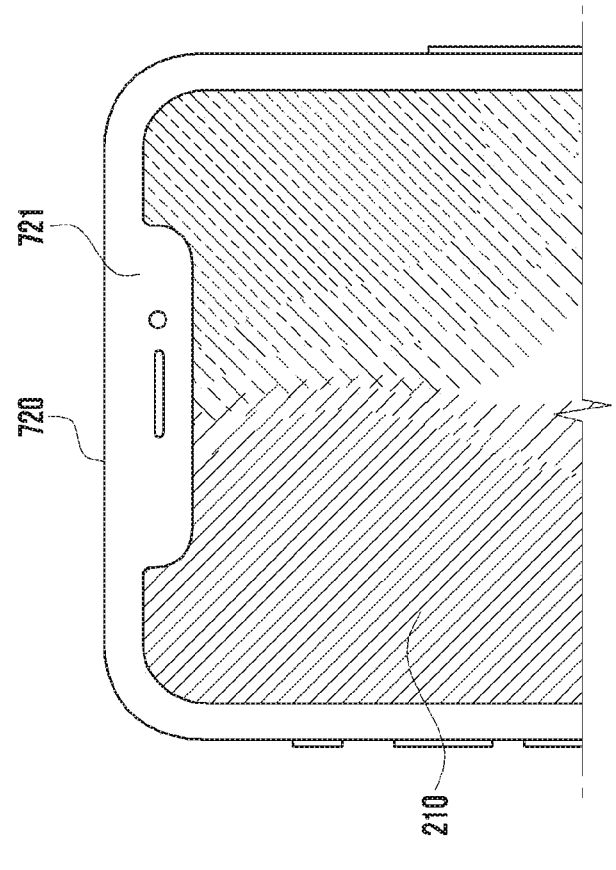
FIGS. 7A and 7B are diagrams illustrating a visual effect produced on electronic devices having different exteriors by means of a visual effect provision system according to various disclosed embodiments.
Figure 7A:
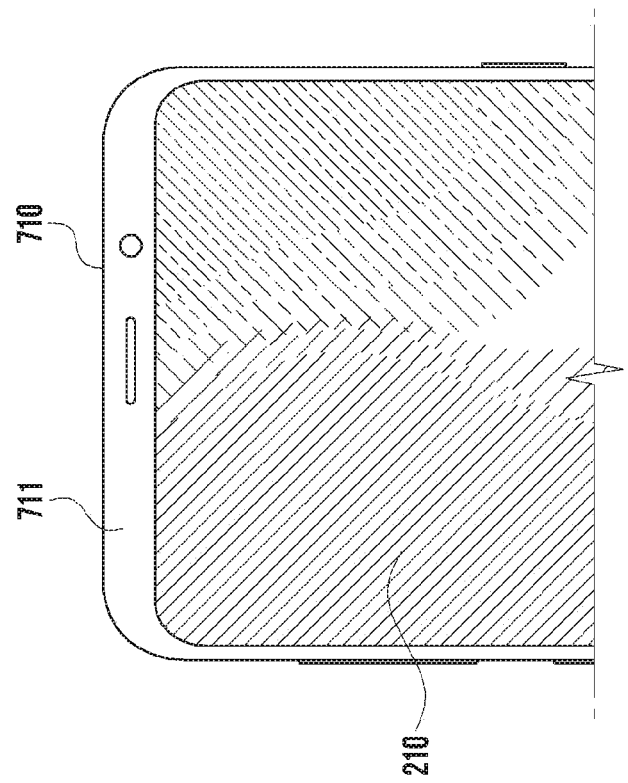
Figure 7B:
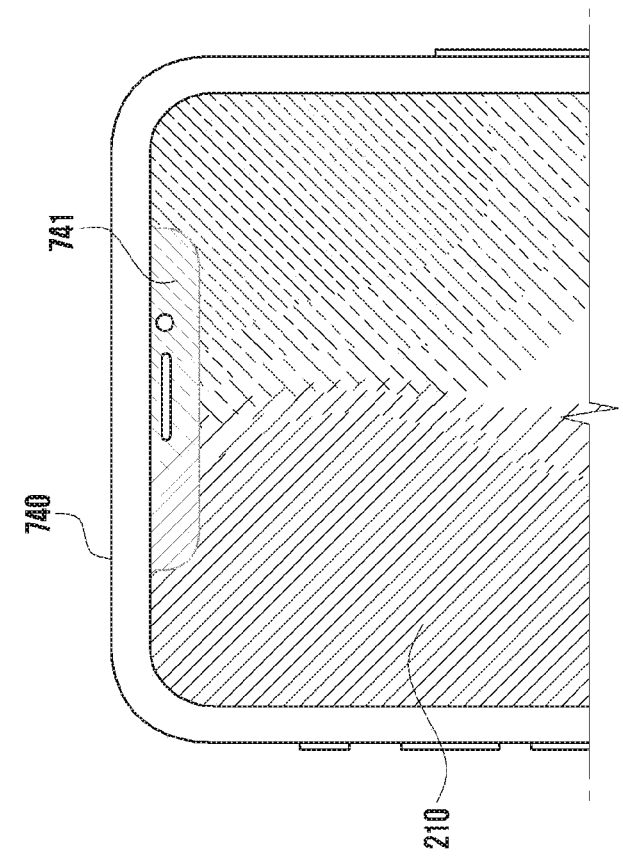
Figure 7B:
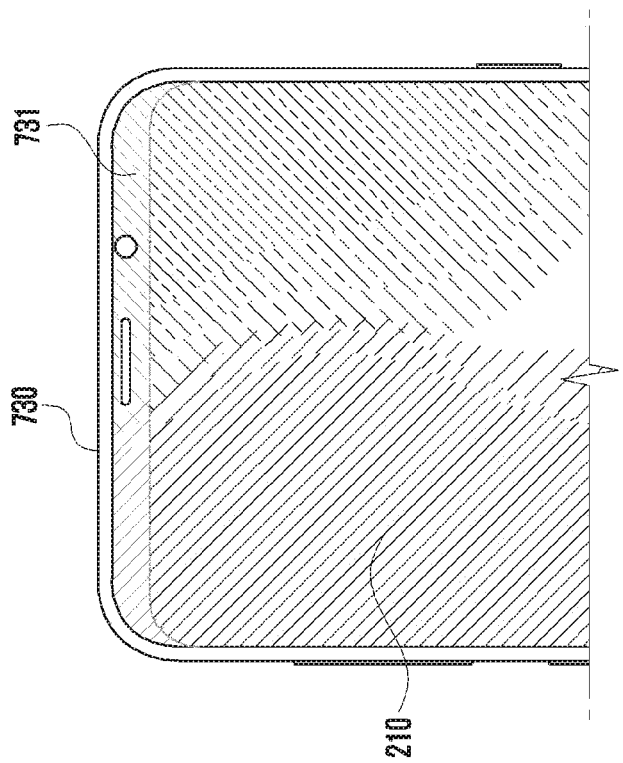

FIGS. 7A and 7B are diagrams for explaining a visual effect produced on electronic devices having different exteriors by means of a visual effect provision system according to various disclosed embodiments.

According to various embodiments, electronic devices may be designed to have different shapes of a bezel separated from the display 210 as shown in FIG. 7A. For example, a first electronic device 710 has a bezel area 711 that is a little broader than that of a second electronic device 720 and that is delimited by a simple border line. Meanwhile, the bezel area 721 of the second electronic device 720 has a notch for mounting a speaker, which makes the user feel awkward.

According to various embodiments, a third electronic device 730 and a fourth electronic device 740 may be designed to provide a visual effect which feels as if the bezel area 731 and 741 is continuously extended from the display 210 by means of the visual effect provision system 300. For example, the third electronic device 730 may be designed such that the bezel area 731 display a continuous color changing from an image displayed on the display 210. For reference, a first pattern and a second pattern depicted in the drawing may correspond to a first color and a second color, respectively, which feels as if an image displayed on the display 210 is continuously extended to the bezel area 731. For example, the fourth electronic device 740 may be designed such that the bezel area 741 is capable of outputting a color that is continuous from that of the image display on the display 210, which mitigates the awkwardness or repulsion of the notch design.

Figure 8A:
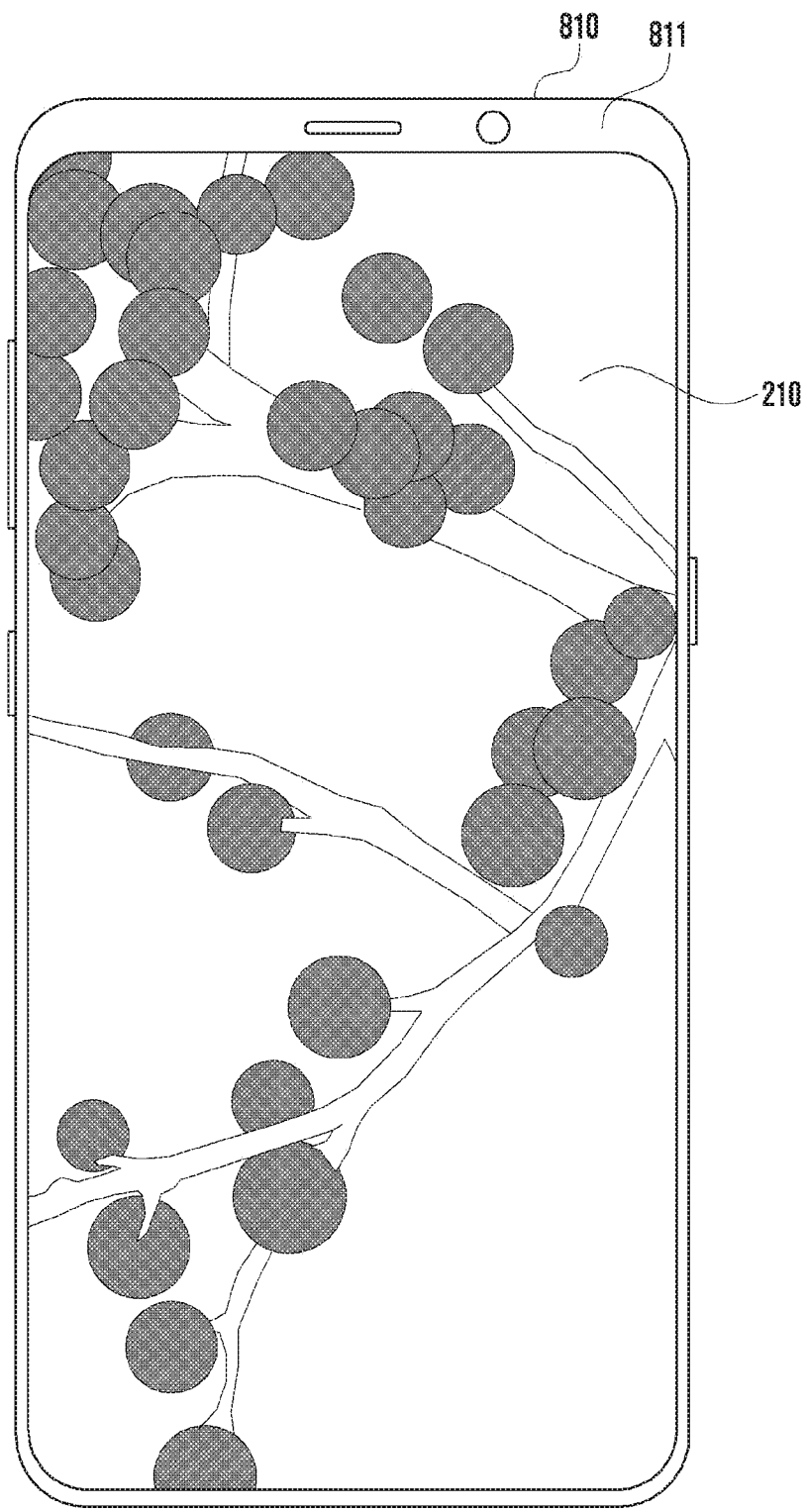
FIGS. 8A to 8C are diagrams illustrating screen displays for explaining a visual effect produced by a visual effect provision system of an electronic device according to various disclosed embodiments.
Figure 8B:
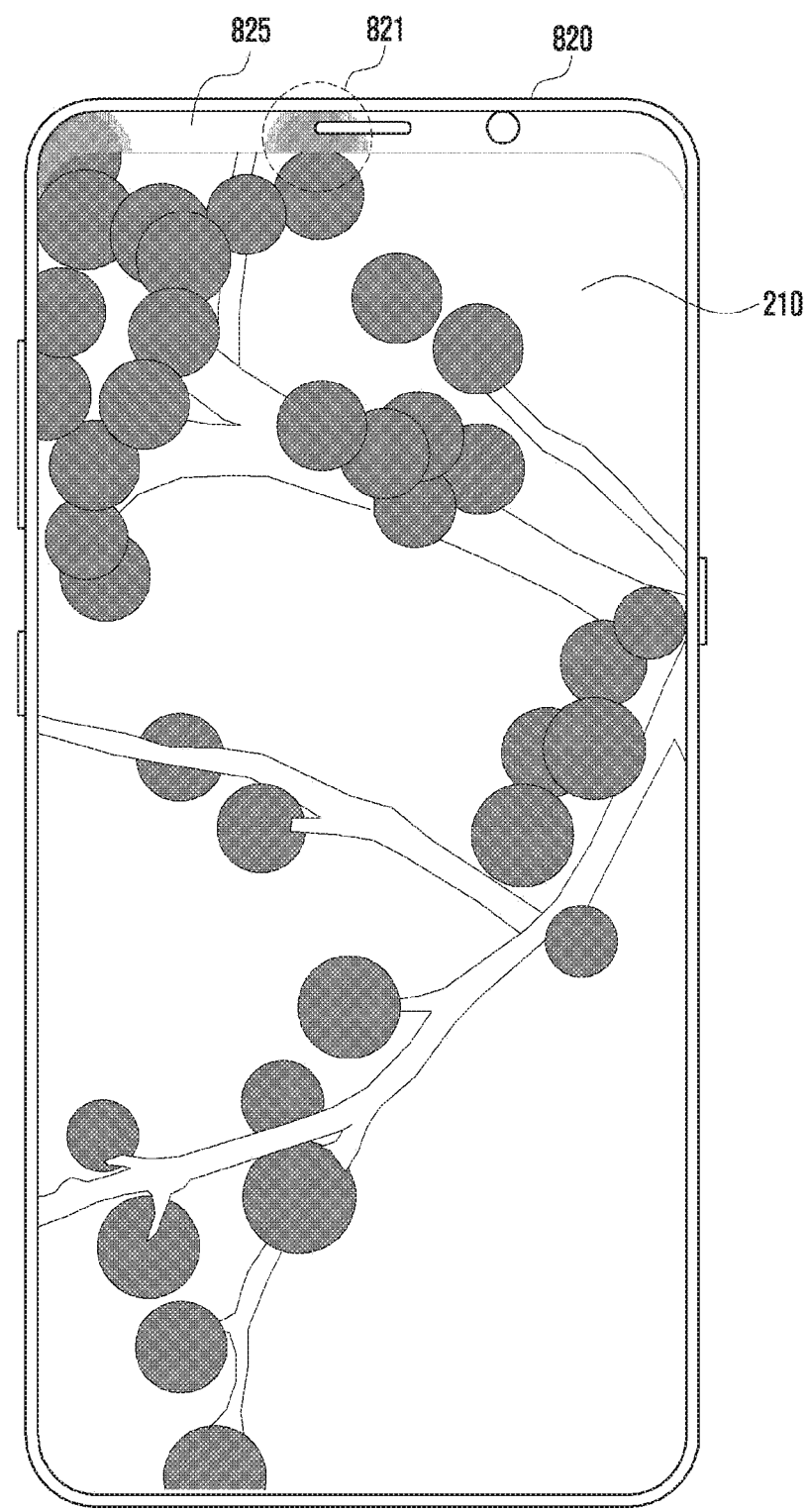
Figure 8C:
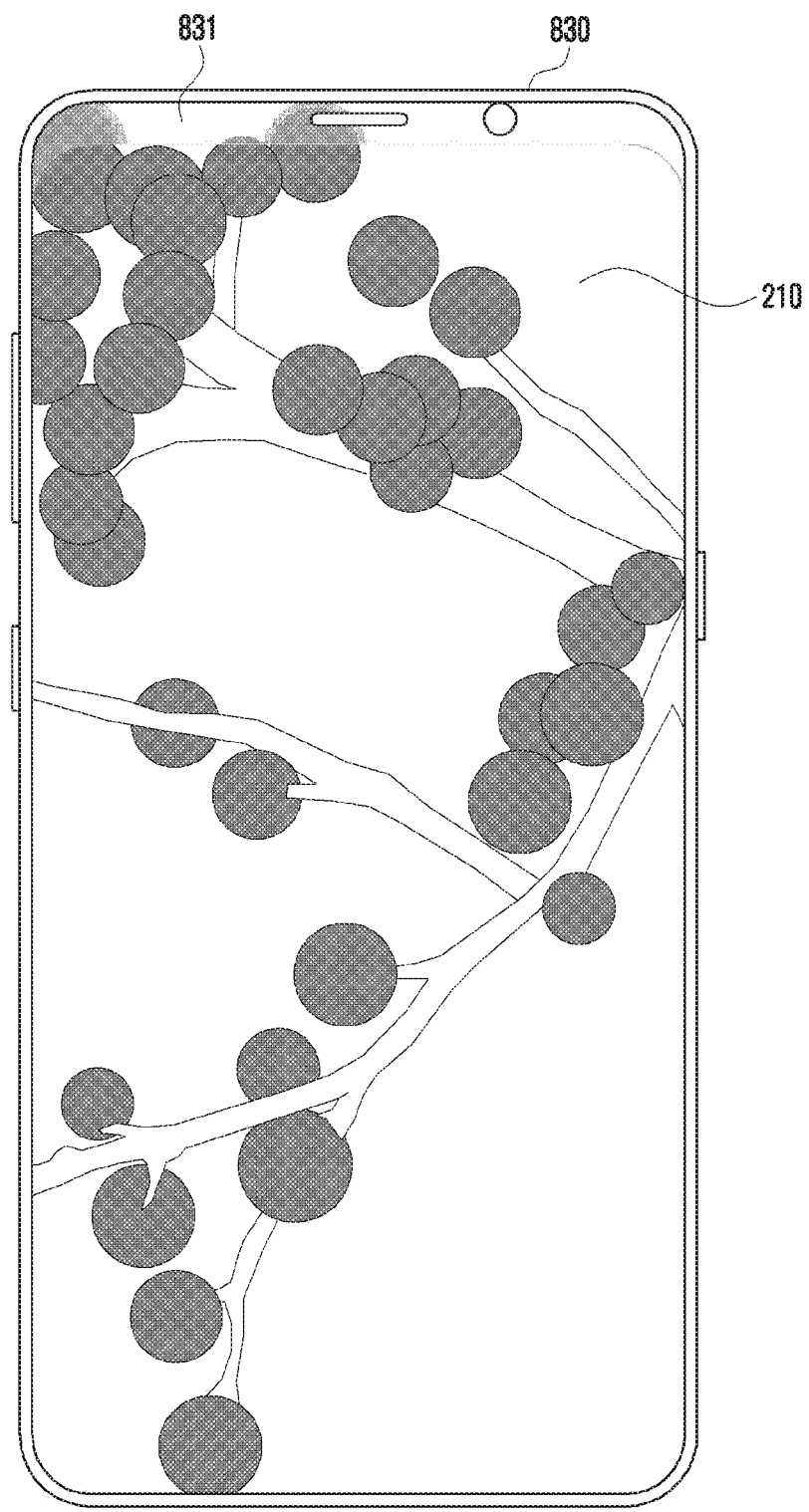

FIGS. 8A to 8C are diagrams illustrating screen displays for explaining a visual effect produced by a visual effect provision system of an electronic device according to various disclosed embodiments.

According to various embodiments, a front surface of a first electronic device 810 may include a display 210 and a bezel area 811 as shown in FIG. 8A. For example, the first electronic device 810 may not produce any visual effect in the bezel area 811. In this case, the user may perceive the bezel area 811 as being clearly separated from the display 210.

According to various embodiments, a front surface of a second electronic device 820 may include a display 210 and a bezel area 825 as shown in FIG. 8B. For example, the second electronic device 820 may display a partial image 821 corresponding to an edge part of an image displayed on the display 210 or emit a light corresponding to the partial image 821 onto the bezel area 825. In this case, because the partial image 821 lacks continuity in association with the image displayed on the display, the sense of openness or immersion for the user may be relatively less strong.

According to various embodiments, a front surface of a third electronic device 830 may include a display 210 and a bezel area 831 as shown in FIG. 8C. For example, the third electronic device 830 may enlarge the size of an image being displayed on the display 210 such that the image is extended to the bezel area 831. In this case, a light with a color corresponding to the extended part of the image displayed on the display 210 is emitted onto the bezel area 831. In this case, because the image corresponding to the bezel area 831 is continuous with the image displayed on the display 210, the sense of openness or immersion for the user may be enhanced.

Figure 9:
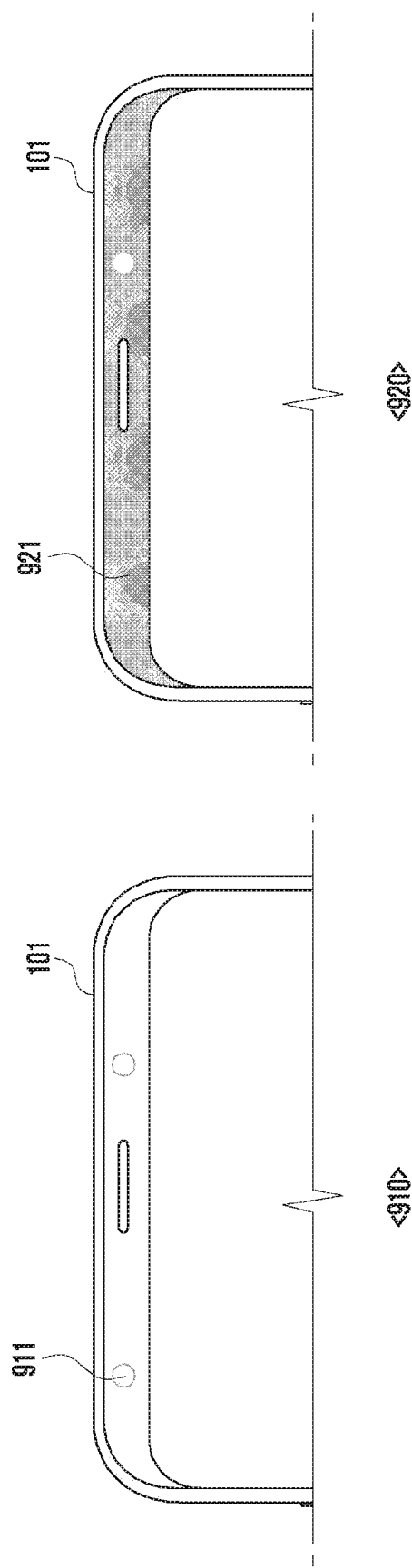
FIG. 9 is a diagram illustrating a method for providing a user with a notification by means of a visual effect provision system of an electronic device according to various disclosed embodiments.

FIG. 9 is a diagram for explaining a method for providing a user with a notification by means of a visual effect provision system of an electronic device according to various disclosed embodiments.

According to various embodiments, the electronic device 101 may display at least one notification by means of the visual effect provision system as shown in FIG. 9.

According to various embodiments, the electronic device 101 may include a bezel having a hole 911 through which a light source may emit at least one notification light as shown in part <910> of FIG. 9. In this case, because a notification location and colors are predetermined, the kinds of notification that can be provided to the user may be limited.

According to various embodiments, the electronic device 101 may include a light emitting module 921 in a bezel area for providing various kinds of notifications as shown in part <920> of FIG. 9. In this case, the whole area of the bezel can be used for providing one of various types of notifications by controlling color, size, location, shape, motion, etc. of a notification pattern.

Figure 10:
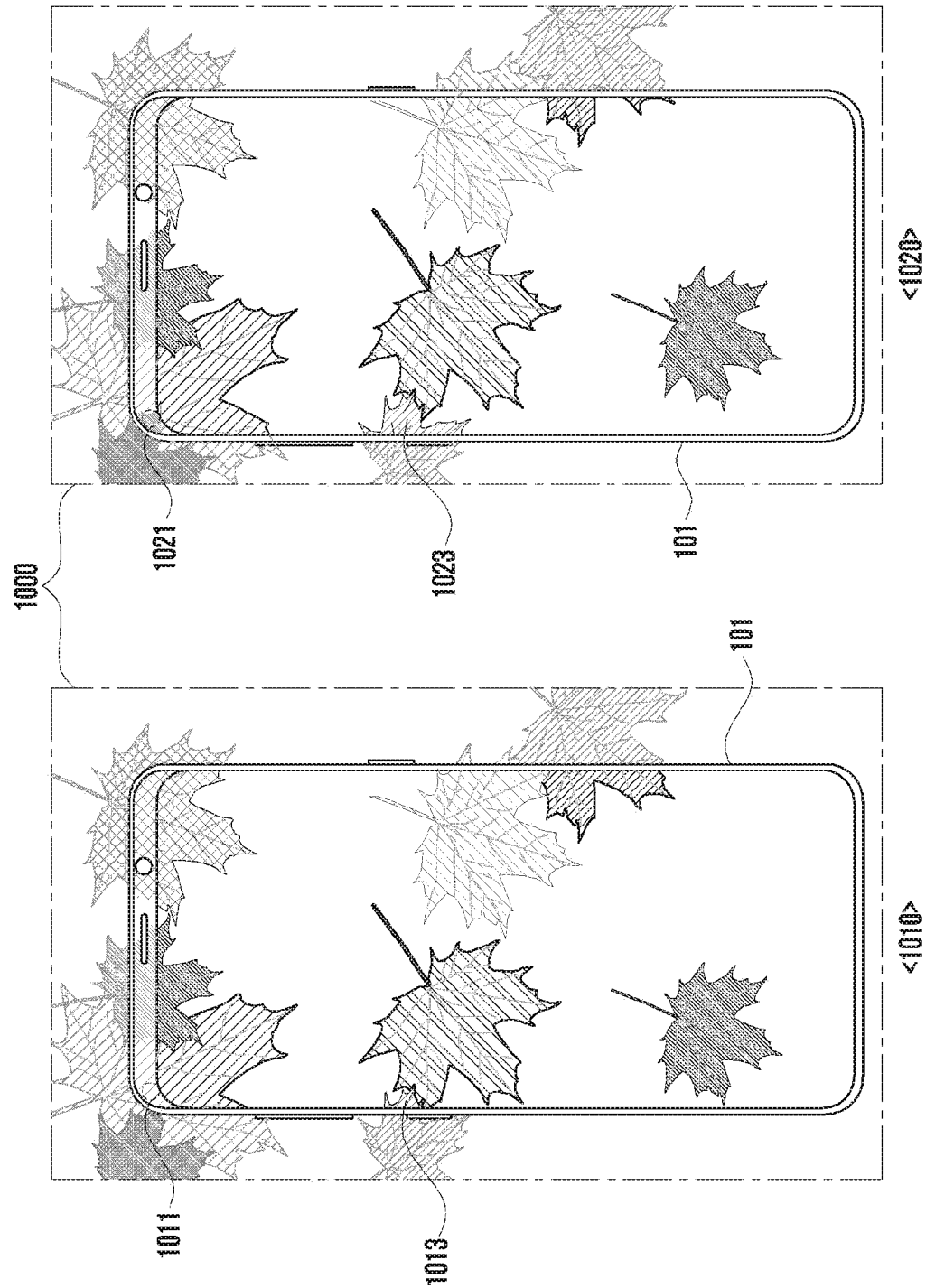
FIGS. 10 and 11 are diagrams illustrating a method for providing a user with a visual effect by means of a visual effect provision system of an electronic device according to various disclosed embodiments.
Figure 11:
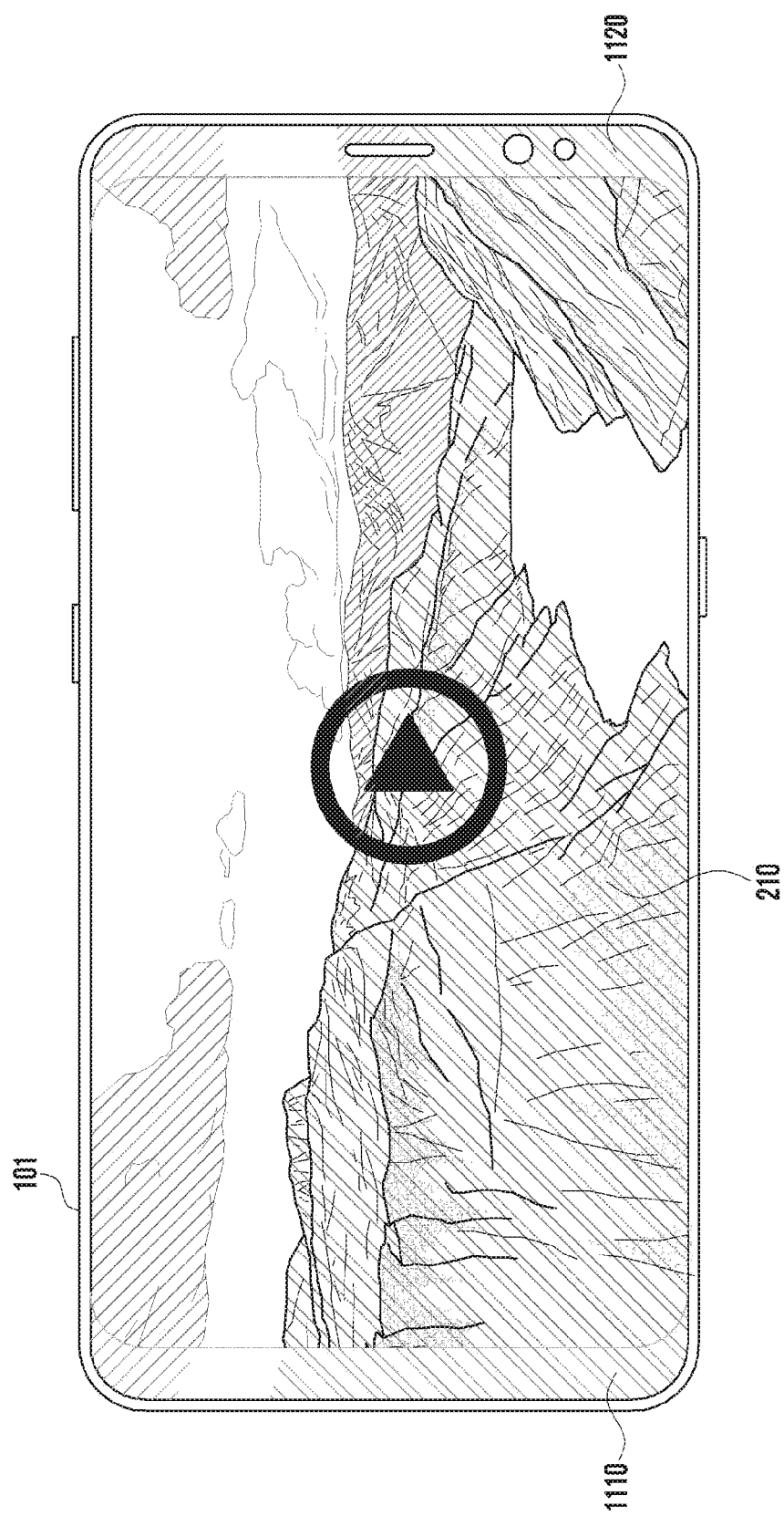

FIGS. 10 and 11 are diagrams for explaining a method for providing a user with a visual effect by means of a visual effect provision system of an electronic device according to various disclosed embodiments.

According to various embodiments, the electronic device 101 may be configured such that an image displayed on a display 1013 and 1023 is zoomed in or out or moved to display one of different visual effects on the bezel area 1011 and 1021 as shown in FIG. 10. For example, if a user drags the image 1000 of which part is displayed on the display 1013 as shown in part <1010> of FIG. 10, the image 1000 moves to the right such that the image 1000 is displayed on the display 1023 as shown in part <1020> of FIG. 10. In this case, the color of the images in the bezel areas 1011 and 1021 may differ between <1010> and <1020> of FIG. 10. That is, the electronic device 101 may control the operation of the light emitting module 310 mounted below the bezel area in response to a user input.

According to various embodiments, the electronic device 101 may analyze color information of the content in use by the user and control colors of bezel area 1110 and 1120 to give the user a sense of continuity between the display 210 and the bezel area 1110 and 1120 as shown in FIG. 11. For example, in the case where the user is watching a video, the electronic device 101 may control the light emitting module 310 to emit light of colors identical with those of objects included in the video such as sky, mountains, and clouds.

Figure 12A:
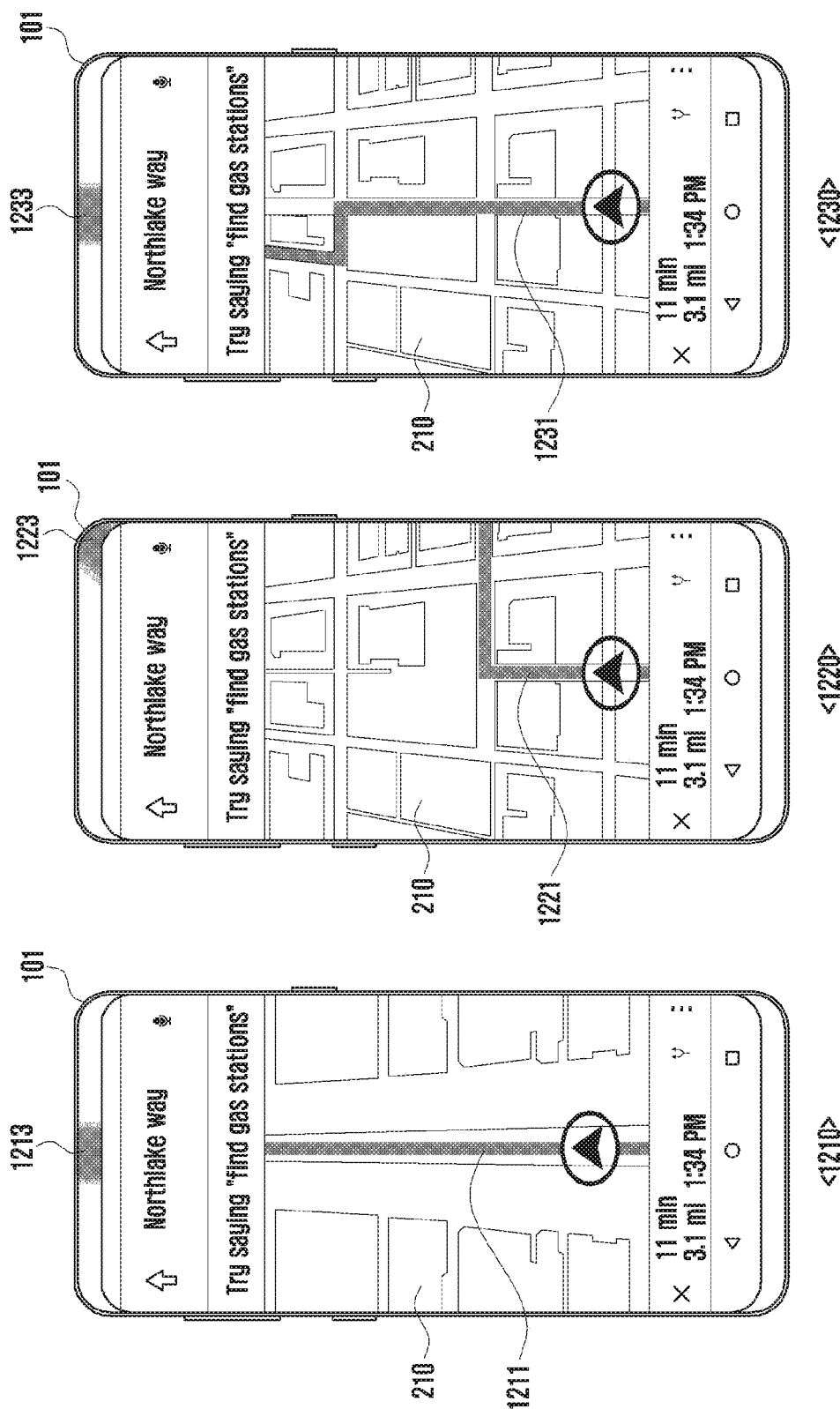
FIGS. 12A and 12B are diagrams illustrating a method for supporting a navigation function using a visual effect provision system of an electronic device according to various disclosed embodiments.
Figure 12B:
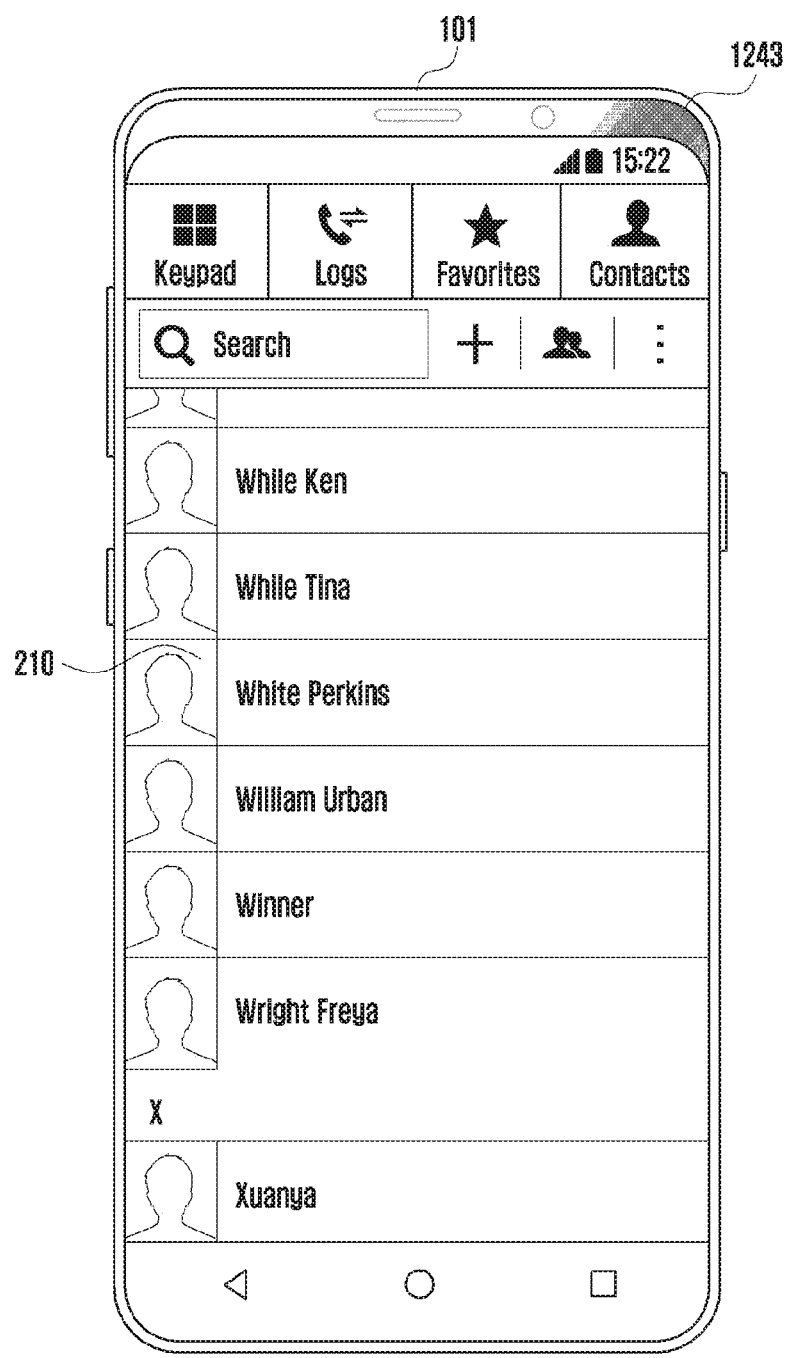

FIGS. 12A and 12B are diagrams for explaining a method for supporting a navigation function using a visual effect provision system of an electronic device according to various disclosed embodiments.

According to various embodiments, the electronic device may control the light emitting module 310 to display navigation information by means of the visual effect provision system 300 as shown in FIG. 12A.

According to various embodiments, the electronic device 101 may display an execution screen of a navigation application on the display 210 as shown in part <1210> of FIG. 12. For example, the execution screen may display a navigation guidance line indicating a straight-ahead direction as denoted by reference number 1211 in part <1210> of FIG. 12. In this case, the electronic device 101 may control the light emitting module 310 to emit a light 1213 at the center of the bezel area to indicate the straight ahead direction.

According to various embodiments, the electronic device 101 may display an execution screen of a navigation application on the display 210 as shown in part <1220> of FIG. 12. For example, the execution screen may display a navigation guidance line indicating a right turn as denoted by reference number 1221 in part <1220> of FIG. 12. In this case, the electronic device 101 may control the light emitting module 310 to emit a light 1223 at the right part of the bezel area to indicate a right turn direction.

According to various embodiments, the electronic device 101 may display an execution screen of a navigation application on the display 210 as shown in part <1230> of FIG. 12. For example, the execution screen may display a navigation guidance line indicating the straight ahead direction as denoted by reference number 1231. In this case, the electronic device 101 may control the light emitting module 310 to emit a light 1233 at the center of the bezel area to indicate the straight ahead direction again.

According to various embodiments, the electronic device 101 may control the light emitting module 310 to emit a light indicating a navigation direction as denoted by reference number 1243 by means of the visual effect provision system 300 even when the navigation application is running in the background. For example, the electronic device 101 may display an execution screen of a contact application on the display 210. The electronic device 101 may provide the user with information on the navigation direction, using the bezel area, as denoted by reference number 1243, while the navigation application is running in the background.

Figure 13:
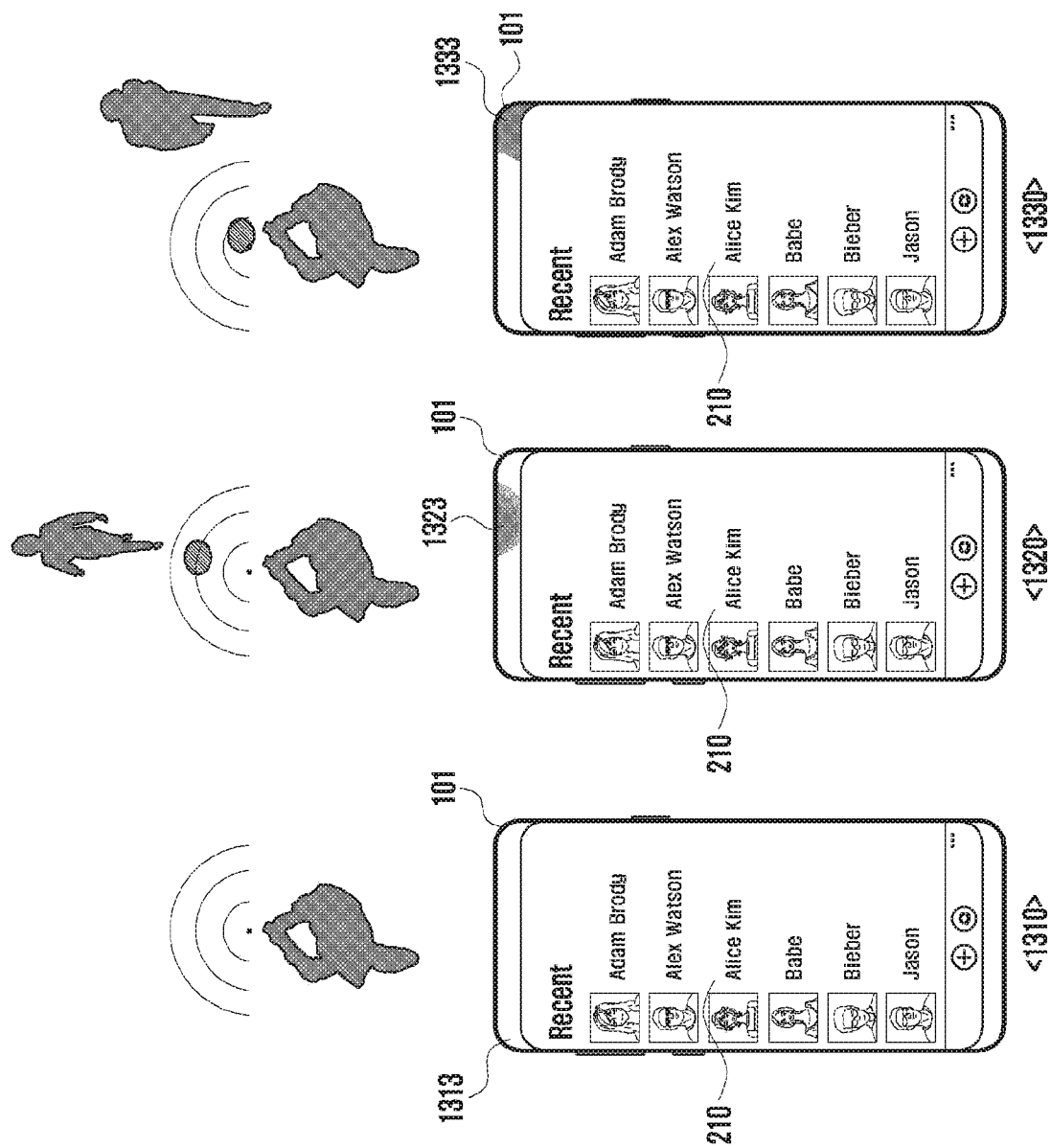
FIG. 13 is a diagram illustrating a method for providing surrounding object information using a visual effect provision system of an electronic device according to various disclosed embodiments.

FIG. 13 is a diagram for explaining a method for providing surrounding object information using a visual effect provision system of an electronic device according to various disclosed embodiments.

According to various embodiments, the electronic device 101 may control the light emitting module to emit a light indicative of a proximity degree of an object in its surroundings by means of the visual effect provision method.

According to various embodiments, the electronic device 101 may display a recent call history screen on the display 210 as shown in part <1310> of FIG. 13. Using the electronic device on the move distracts the user's attention from the surroundings, which may cause an accident such as a crash into an fixed object. In this regard, the electronic device 101 may provide the user with information indicative of a proximity of an object in its surroundings on the bezel area. For example, if there is no object being detected in the surroundings of the electronic device 101, no information may be displayed on the bezel area, indicated by 1313.

According to various embodiments, the electronic device 101 may detect an object, e.g., a person, approaching from the right front by means of a sensor as shown in part <1320> of FIG. 13. In this case, the electronic device 101 may display surrounding object information 1323 at a region biased to the right from the center of the bezel area. The electronic device 101 may decrease the brightness of the light emitted by the light emitting module 310 in accordance with the distance from the approaching person.

According to various embodiments, the electronic device 101 may detect a person passing by the right side of the user by means of a sensor as shown in part <1330> of FIG. 13. In this case, the electronic device 101 may display surrounding object information 1333 at a right-most region of the bezel area. The electronic device 101 may increase the brightness of the light emitted by the light emitting module 310 as the person draws near.

Figure 14A:
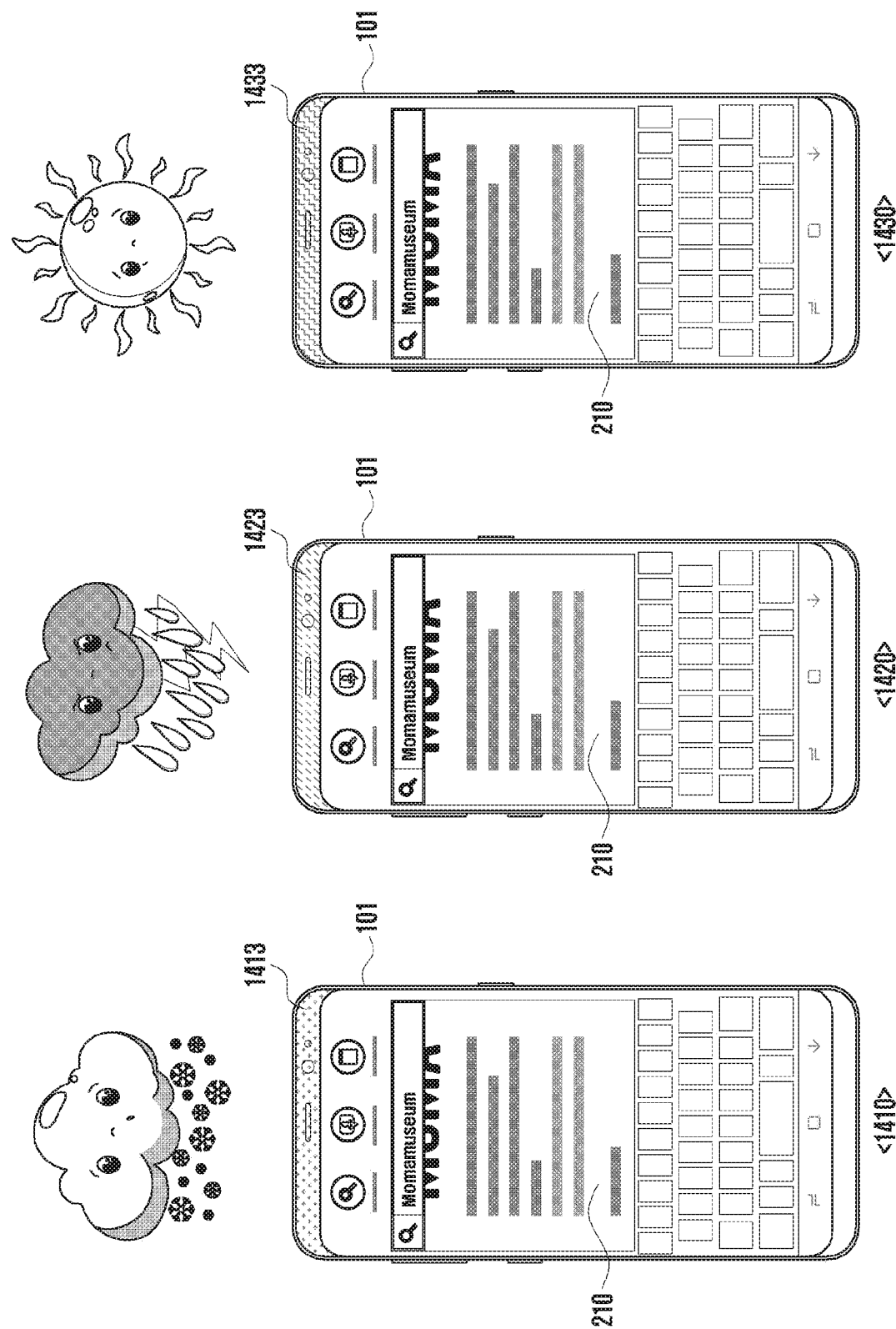
FIGS. 14A and 14B are diagrams illustrating a method for providing weather information using a visual effect provision system of an electronic device according to various disclosed embodiments.
Figure 14B:
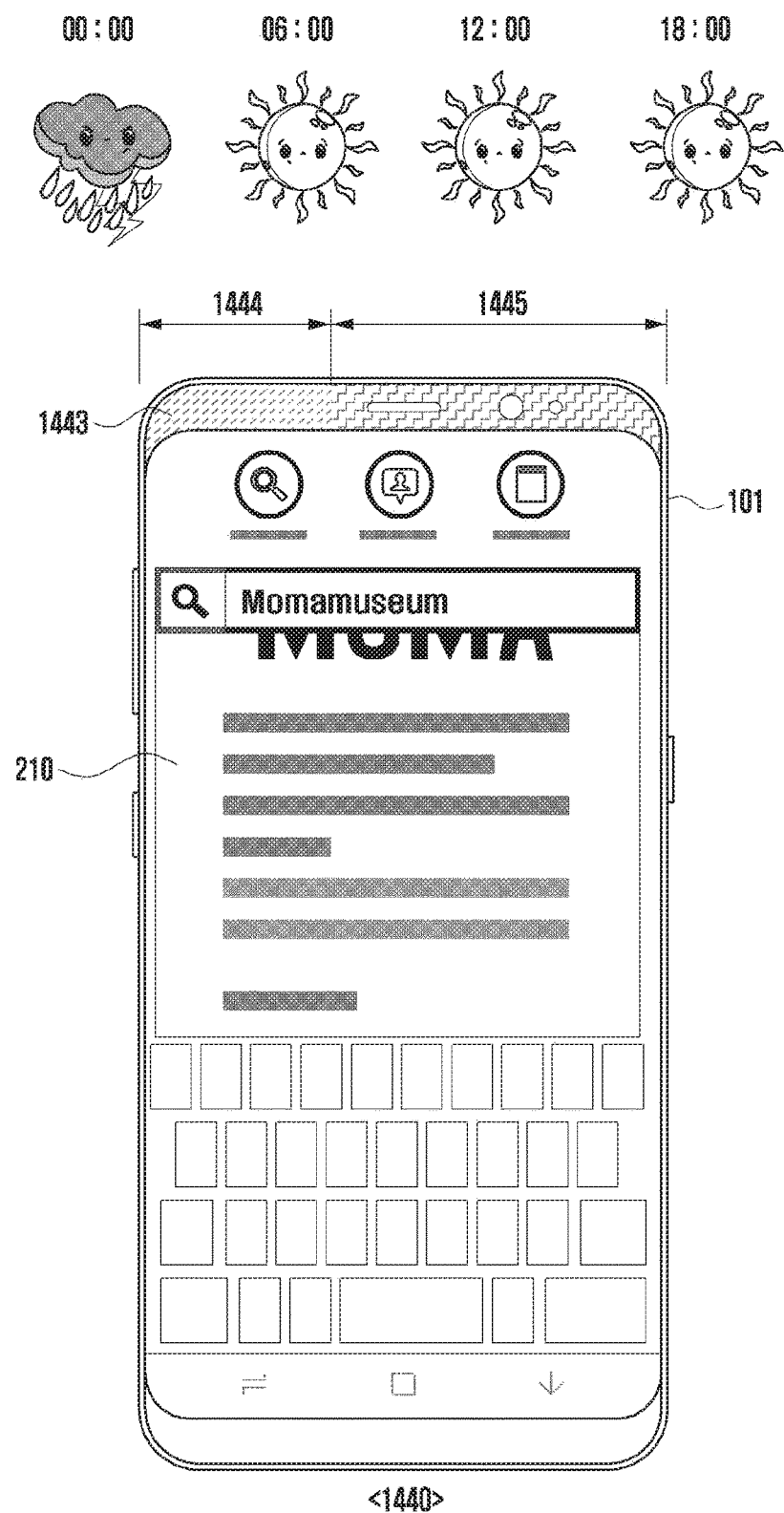

FIGS. 14A and 14B are diagrams for explaining a method for providing weather information using a visual effect provision system of an electronic device according to various disclosed embodiments.

According to various embodiments, the electronic device 101 may be configured to provide a visual effect indicative of current weather on the bezel area by means of the visual effect provision system 300 as shown in FIG. 14A.

According to various embodiments, the electronic device 101 may display current weather information on the bezel area 1413 as shown in part <1410> of FIG. 14A. For example, if it is snowing, the electronic device 101 may control the light emitting module 310 to emit a white light.

According to various embodiments, the electronic device 101 may display current weather information on the bezel area 1423 as shown in part <1420> of FIG. 14A. For example, if it is raining, the electronic device 101 may control the light emitting module 310 to emit a blue light.

According to various embodiments, the electronic device 101 may display current weather information on the bezel area 1433 as shown in part <1430> of FIG. 14A. For example, if it is sunny, the electronic device 101 may control the light emitting module 310 to emit a yellow or red light.

According to various embodiments, the electronic device 101 may provide a visual effect that varies according to weather forecast information on the bezel area by means of the visual effect provision system 300.

According to various embodiments, the electronic device may display today's weather forecast information on the bezel area as shown in part <1440> of FIG. 14B. For example, the electronic device 101 may receive the weather forecast information forecasting rainfall between midnight and 6 AM and becoming clear afterward. The electronic device 101 may divide the bezel area 1443 to display hour-by-hour weather forecast information thereon based on the weather forecast information. For example, the electronic device 101 may control the light emitting module 310 to emit a blue light indicative of rainfall in a first bezel region 1444 and a yellow or red light indicative of clear sky in a second bezel region 1445.

Figure 15A:
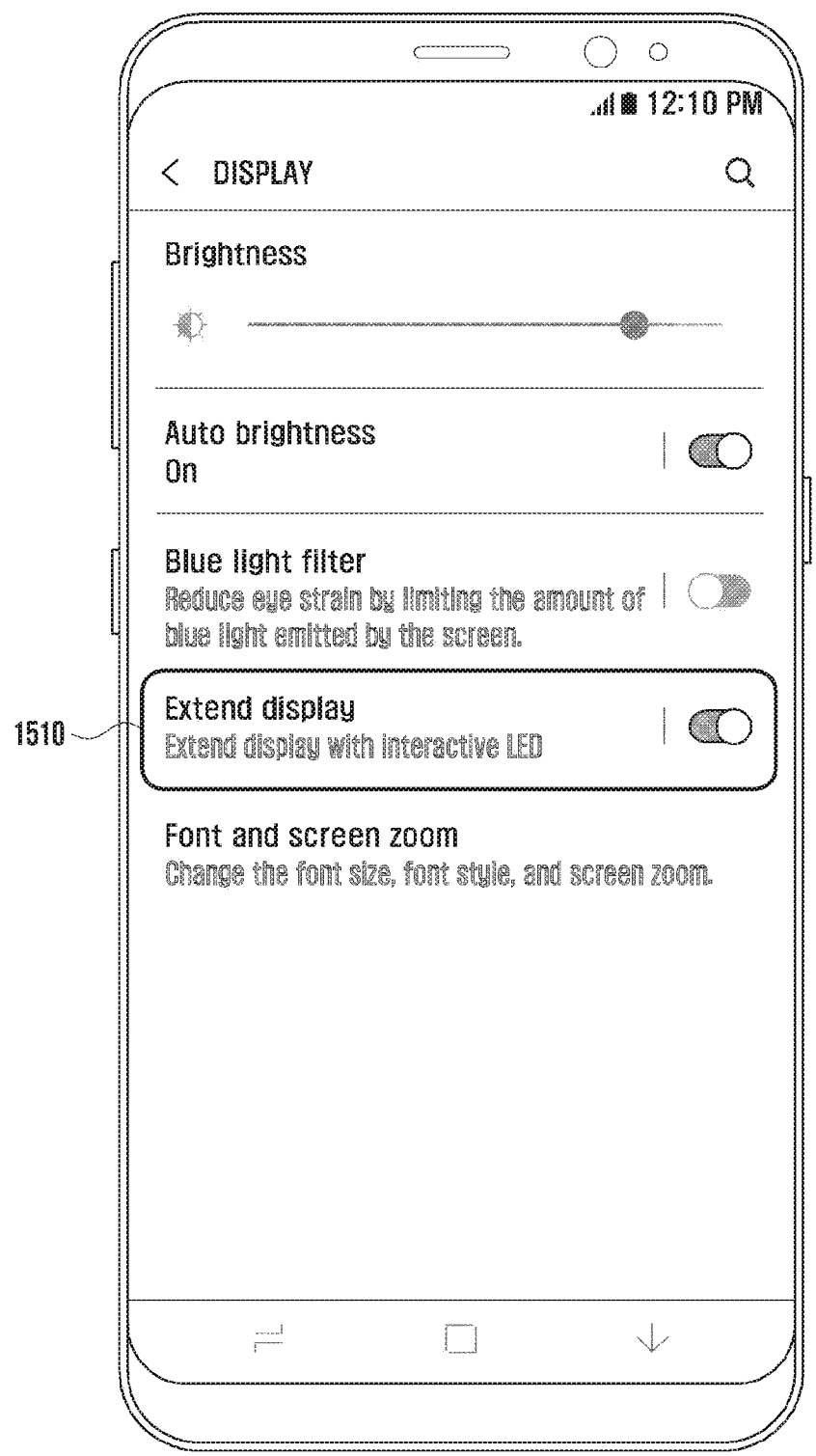
FIGS. 15A and 15B are diagrams illustrating a user interface for controlling a visual effect provision system of an electronic device according to various disclosed embodiments.
Figure 15B:
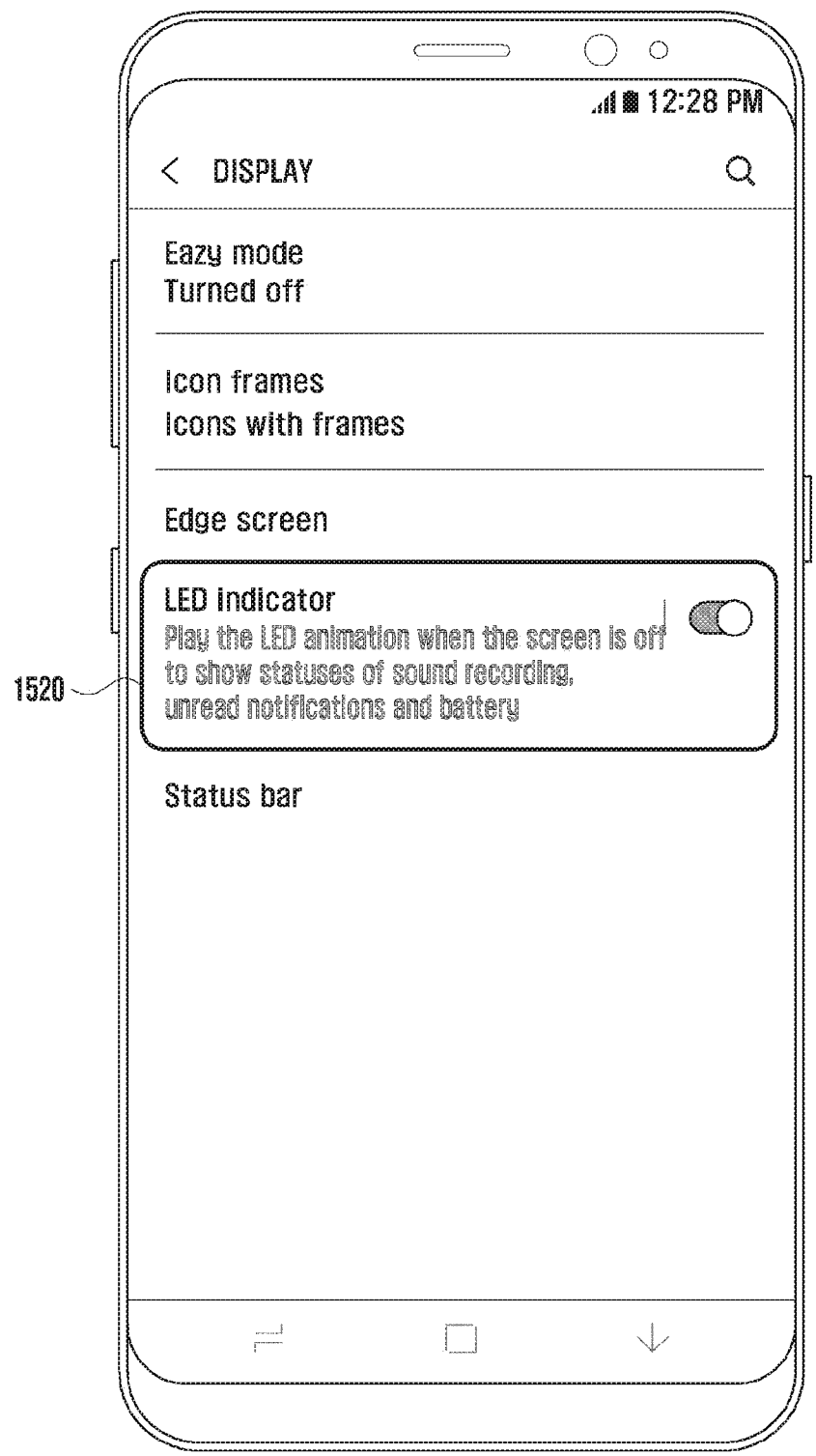

FIGS. 15A and 15B are diagram illustrating a user interface for controlling a visual effect provision system of an electronic device according to various disclosed embodiments.

According to various embodiments, the electronic device 101 may provide the user interface for controlling the visual effect provision system 300 as shown in FIG. 15A. For example, the user interface may include an extended display option (or menu) 1510. The electronic device 101 may control the light emitting module 310 to produce one of various visual effects on the bezel area upon receipt of a user input for activating the corresponding option.

According to various embodiments, the electronic device 101 may provide the user interface for controlling the visual effect provision system 300 as shown in FIG. 15B. For example, the user interface may include an LED indicator option (or menu) 1520. The electronic device 101 may control the light emitting module 310 to produce a visual effect indicative of one of various kinds of information on the bezel area upon receipt of a user input for activating the corresponding option even when the screen is turned off.

Figure 16A:
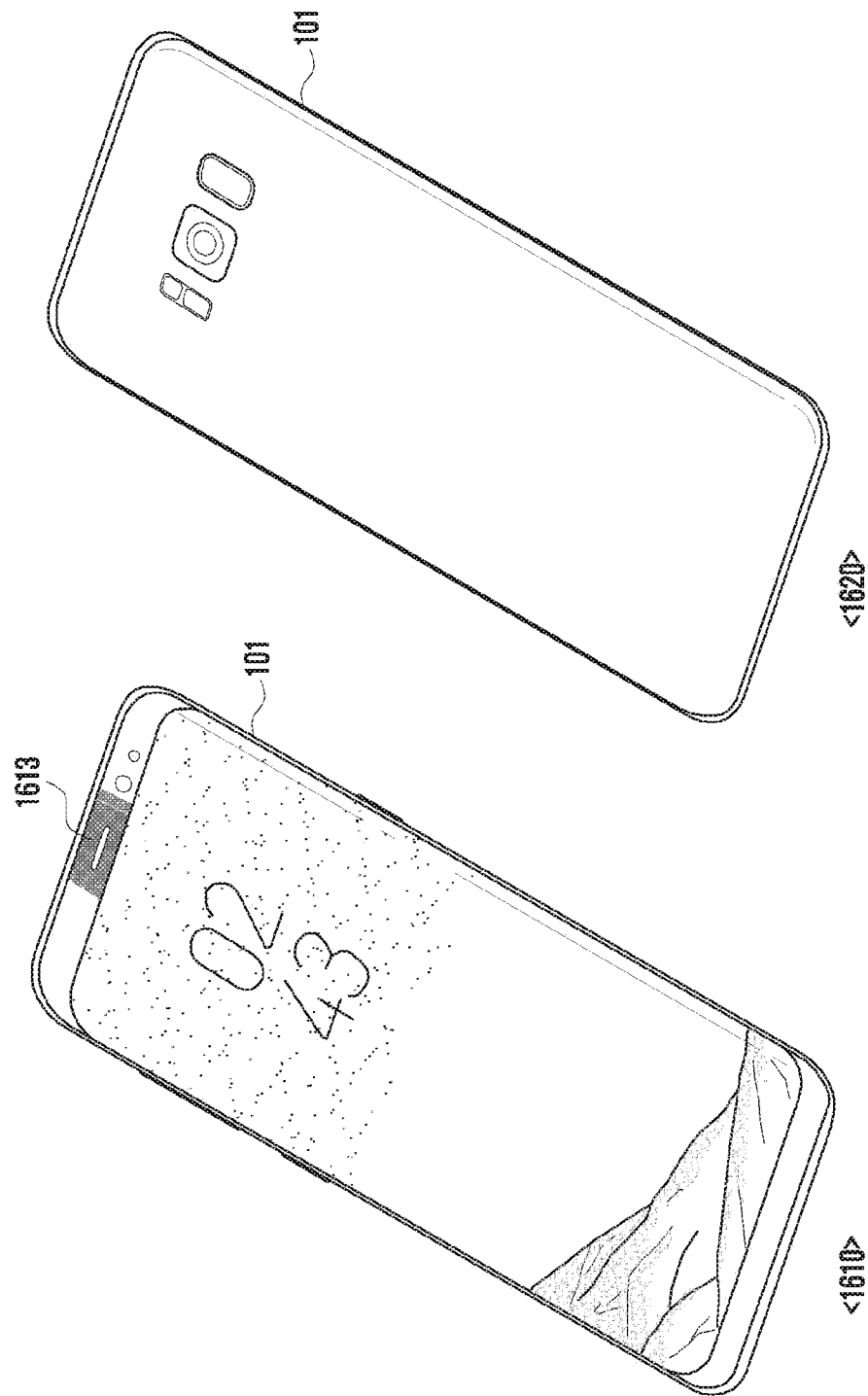
FIGS. 16A and 16B are diagrams illustrating conditions for controlling a visual effect provision system of an electronic device according to various disclosed embodiments.
Figure 16B:
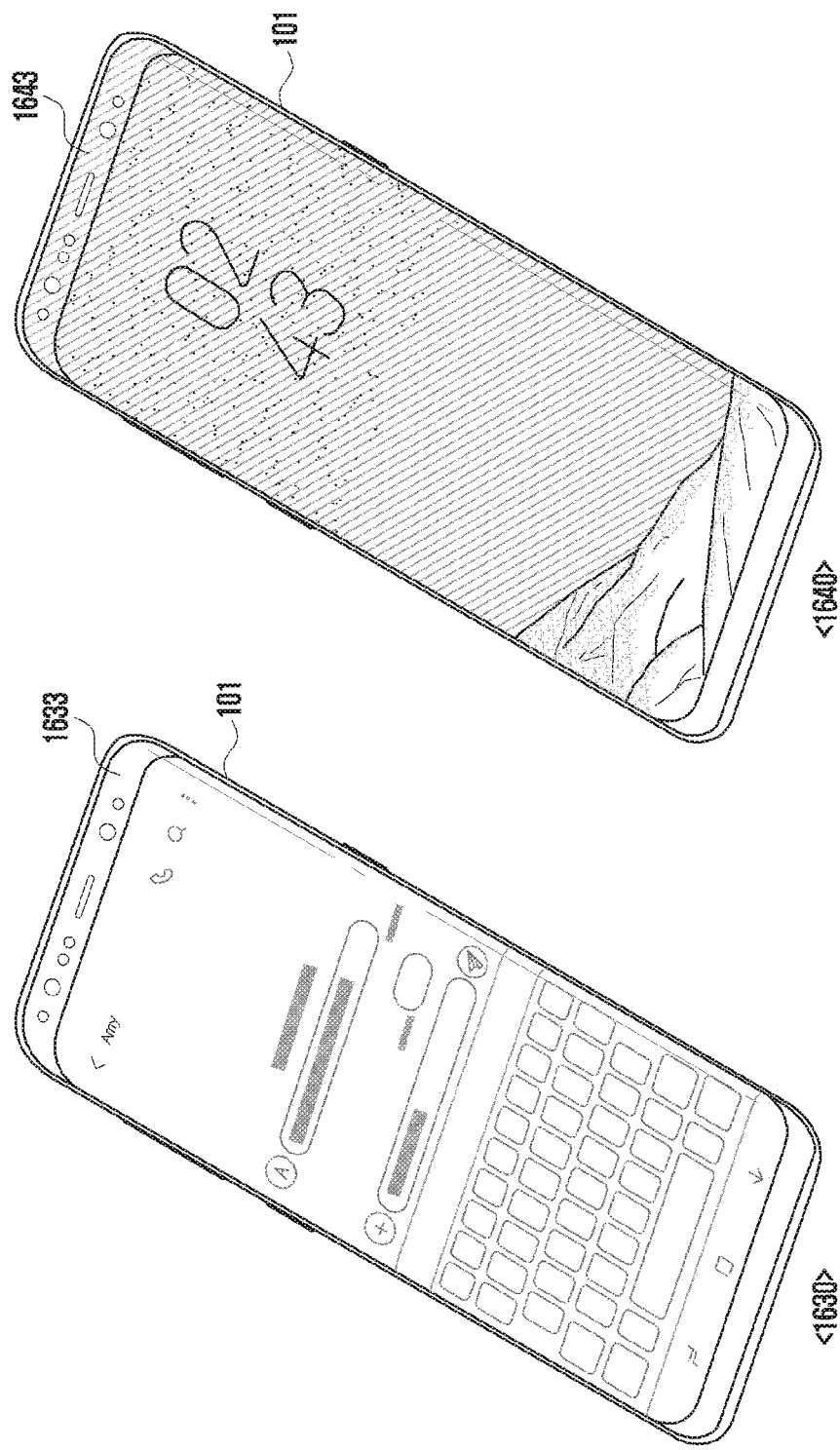

FIGS. 16A and 16B are diagrams for explaining conditions for controlling a visual effect provision system of an electronic device according to various disclosed embodiments.

According to various embodiments, the electronic device 101 may activate or deactivate the visual effect provision system 300 based on the state of the electronic device 101 as shown in FIG. 16A. For example, the electronic device 101 may activate the visual effect provision system 300 and emit a light 1613 in the state where its front surface is uncovered as shown in part <1610> of FIG. 16A. In contrast, the electronic device 101 may deactivate the visual effect provision system 300 in the state where its front surface is covered as shown in part <1620> of FIG. 16A. In this manner, the electronic device 101 may reduce its battery power consumption.

According to various embodiments, the electronic device 101 may activate or deactivate the visual effect provision system 300 based on the state of the electronic device 101 as shown in FIG. 16B. For example, the electronic device 101 may activate the visual effect provision system 300, including in the bezel 1633, in the state where the electronic device 101 is unlocked as shown in part <1630> of FIG. 16B. In contrast, the electronic device 101 may deactivate the visual effect provision system 300, including in the bezel 1643, in the state where the electronic device 101 is locked as shown in part <1640> of FIG. 16B. For reference, the conditions for activating/deactivating the visual effect provision system 300 are not limited to those described above and may vary according to a manufacturer's configuration or be set by the user through a user interface.

According to various embodiments, an electronic device may include a display, a bezel bordering at least one side of the display, a light emitting module including multiple light sources, a light diffusing module arranged above the light emitting module to cover the light emitting module, a memory, and a processor configured to control to display an execution screen of an application on the display, determine attribute information on a light to be emitted by the light emitting module based on the execution screen of the application, and emit the light by means of the light emitting module based on the attribute information on the light.

The light emitting module may be mounted in an inside region of the electronic device that corresponds to the bezel.

The emitted light may be diffused by the light diffusing module to be projected to the bezel.

The bezel may border an upper side of the display.

The bezel may border an upper side and a lower side of the display.

The multiple light sources may be arranged, in an inside region of the electronic device that corresponds to the bezel, at an interval allowing different types of light emitted by the multiple light sources and diffused by the light diffusing module to be partially overlapped with each other.

The processor may be configured to control to enlarge an image displayed in the execution screen of the application and acquire color information of the enlarged image at a location corresponding to the light emitting module arranged below the bezel.

The processor may be configured to control to determine the attribute information based on the acquired color information, the attribute information including at least one of a color, a size, a location, a direction, or a movement of the light to be emitted.

The processor may be configured to control to acquire notification information of the displayed application and control the light emitting module to produce a visual effect corresponding to the notification information based on the notification information.

The processor may be configured to control to acquire notification information of an application different from the application of which the execution screen is displayed and control the light emitting module to produce a visual effect corresponding to the acquired notification information based on the acquired notification information.

According to various embodiments, a method of an electronic device including a display, a bezel bordering at least one side of the display, a light emitting module including multiple light sources, and a light diffusing module arranged above the light emitting module to cover the light emitting module may include displaying an execution screen of an application on the display, determining attribute information on light to be emitted by the light emitting module based on the execution screen of the application, and emitting the light by means of the light emitting module based on the attribute information on the light.

The light emitting module may be mounted in an inside region of the electronic device that corresponds to the bezel.

The emitted light may be diffused by the light diffusing module to be projected to the bezel.

The bezel may border an upper side of the display.

The bezel may border an upper side and a lower side of the display.

The multiple light sources may be arranged, in an inside region of the electronic device that corresponds to the bezel, at an interval allowing different types of light emitted by the multiple light sources and diffused by the light diffusing module to be partially overlapped with each other.

The method may further include enlarging an image displayed in the execution screen of the application and acquiring color information of the enlarged image at a location corresponding to the light emitting module arranged below the bezel.

The method may further include determining the attribute information based on the acquired color information, the attribute information including at least one of a color, a size, a location, a direction, or a movement of the light to be emitted.

The method may further include acquiring notification information of the displayed application and controlling the light emitting module to produce a visual effect corresponding to the notification information based on the acquired notification information.

The method may further include acquiring notification information of an application different from the application of which the execution screen is displayed and controlling the light emitting module to produce a visual effect corresponding to the acquired notification information based on the acquired notification information.

As described above, the electronic devices of the various disclosed embodiments are advantageous in terms of being provided with a light-emitting module within a bezel area in separation from the display (e.g., touchscreen or touch display screen). The electronic devices are also advantageous in terms of determining a color of light to be emitted by the light emitting module based on an image or information displayed on the display. The electronic devices are also advantageous in terms of providing an aesthetic effect, as if the display screen and the bezel areas are continuous, by controlling the light-emitting module to emit the determined colored light.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a display;
   a bezel bordering at least one side of the display;
   a light emitting module including multiple light sources;
   a light diffusing module arranged above the light emitting module to cover the light emitting module;
   a memory; and
   a processor configured to:
      control to display an execution screen of an application on the display,
      determine attribute information on light to be emitted by the light emitting module based on the execution screen of the application, and
      emit the light by means of the light emitting module based on the attribute information on the light.

2. The electronic device of claim 1, wherein the light emitting module is mounted in an inside region of the electronic device that corresponds to the bezel.

3. The electronic device of claim 1, wherein the emitted light is diffused by the light diffusing module to be projected to the bezel.

4. The electronic device of claim 1, wherein the bezel borders an upper side of the display.

5. The electronic device of claim 1, wherein the bezel borders an upper side and a lower side of the display.

6. The electronic device of claim 1, wherein the multiple light sources are arranged:
   in an inside region of the electronic device that corresponds to the bezel; and
   at an interval allowing different types of light emitted by the multiple light sources and diffused by the light diffusing module to be partially overlapped with each other.

7. The electronic device of claim 1, wherein the processor is configured to:
   control to enlarge an image displayed in the execution screen of the application; and
   acquire color information of the enlarged image at a location corresponding to the light emitting module arranged below the bezel.

8. The electronic device of claim 7, wherein the processor is configured to control to determine the attribute information based on the acquired color information, the attribute information including at least one of a color, a size, a location, a direction, or a movement of the light to be emitted.

9. The electronic device of claim 1, wherein the processor is configured to:
   control to acquire notification information of the displayed application; and
   control the light emitting module to produce a visual effect corresponding to the notification information based on the notification information.

10. The electronic device of claim 1, wherein the processor is configured to:
   control to acquire notification information of an application different from the application of which the execution screen is displayed; and control the light emitting module to produce a visual effect corresponding to the acquired notification information based on the acquired notification information.

11. A method of an electronic device including a display, a bezel bordering at least one side of the display, a light emitting module including multiple light sources, and a light diffusing module arranged above the light emitting module to cover the light emitting module, the method comprising:
displaying an execution screen of an application on the display;
determining attribute information on light to be emitted by the light emitting module based on the execution screen of the application; and
emitting the light by means of the light emitting module based on the attribute information on the light.

12. The method of claim 11, wherein the light emitting module is mounted in an inside region of the electronic device that corresponds to the bezel.

13. The method of claim 11, wherein the emitted light is diffused by the light diffusing module to be projected to the bezel.

14. The method of claim 11, wherein the bezel borders an upper side of the display.

15. The method of claim 11, wherein the bezel borders an upper side and a lower side of the display.

16. The method of claim 11, wherein the multiple light sources are arranged:
in an inside region of the electronic device that corresponds to the bezel; and
at an interval allowing different types of light emitted by the multiple light sources and diffused by the light diffusing module to be partially overlapped with each other.

17. The method of claim 11, further comprising:
enlarging an image displayed in the execution screen of the application; and
acquiring color information of the enlarged image at a location corresponding to the light emitting module arranged below the bezel.

18. The method of claim 17, further comprising determining the attribute information based on the acquired color information, the attribute information including at least one of a color, a size, a location, a direction, or a movement of the light to be emitted.

19. The method of claim 11, further comprising:
acquiring notification information of the displayed application; and
controlling the light emitting module to produce a visual effect corresponding to the notification information based on the acquired notification information.

20. The method of claim 11, further comprising:
acquiring notification information of an application different from the application of which the execution screen is displayed; and
controlling the light emitting module to produce a visual effect corresponding to the acquired notification information based on the acquired notification information.

* * * * *